United States Patent
Okehie et al.

(10) Patent No.: US 8,279,958 B2
(45) Date of Patent: Oct. 2, 2012

(54) RECEIVER AND METHOD

(75) Inventors: Obioma Chiedozie Donald Okehie, Redhill (GB); Samuel Asangbeng Atungsiri, Basingstoke (GB)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 12/782,165

(22) Filed: May 18, 2010

(65) Prior Publication Data

US 2010/0310016 A1 Dec. 9, 2010

(30) Foreign Application Priority Data

Jun. 3, 2009 (GB) .................................. 0909579.5

(51) Int. Cl.
*H04L 27/28* (2006.01)
(52) U.S. Cl. ........ 375/260; 375/229; 375/265; 375/267; 375/340; 375/343
(58) Field of Classification Search .................. 375/260, 375/229, 265, 267, 340, 343; 370/203, 208, 370/209, 210, 328, 350
See application file for complete search history.

(56) References Cited

U.S. PATENT DOCUMENTS

| | | | |
|---|---|---|---|
| 7,869,551 B2 * | 1/2011 | Krishnan et al. ............... | 375/354 |
| 2009/0003308 A1 | 1/2009 | Baxley et al. | |
| 2009/0011722 A1 | 1/2009 | Kleider et al. | |
| 2009/0042530 A1 * | 2/2009 | Wang et al. .................... | 455/334 |
| 2009/0161782 A1 * | 6/2009 | Kolze et al. ................... | 375/260 |

FOREIGN PATENT DOCUMENTS

| | | |
|---|---|---|
| EP | 1 968 268 A2 | 9/2008 |
| EP | 2 031 783 A1 | 3/2009 |
| GB | 2 412 551 A | 9/2005 |
| WO | WO 2009/020942 A1 | 2/2009 |

OTHER PUBLICATIONS

Fang-Hsu Lu, et al., "Channel Estimation for DVB-T Receiver with Asynchronous Sampling Clock", The 13th IEEE International Symposium on Consumer Electronics, XP 31484426, May 25, 2009, pp. 513-517.
U.S. Appl. No. 12/782,991, filed May 19, 2010, Atungsiri.

* cited by examiner

*Primary Examiner* — Dhaval Patel
(74) *Attorney, Agent, or Firm* — Oblon, Spivak, McClelland, Maier & Neustadt, L.L.P.

(57) ABSTRACT

A receiver for receiving a sequence of OFDM symbols transmitted via a channel. Each OFDM symbol comprises a plurality of data bearing sub-carriers and a plurality of pilot bearing sub-carriers. The receiver includes a channel estimator, and the channel estimator includes a pilot data extractor, a pilot data extrapolator and a pilot data interpolator operable to process the pilot data by interpolating between the extrapolated pilot data in time and frequency. The receiver also comprises a discontinuity detector for detecting a discontinuity in the pilot data processed by the channel estimator, and a controller, which upon detection of a pilot data discontinuity by the discontinuity detector, is operable to provide a control signal to the channel estimator which causes at least one of the pilot data extractor, the pilot data extrapolator and the pilot data interpolator to compensate for the discontinuity in the pilot data.

14 Claims, 15 Drawing Sheets

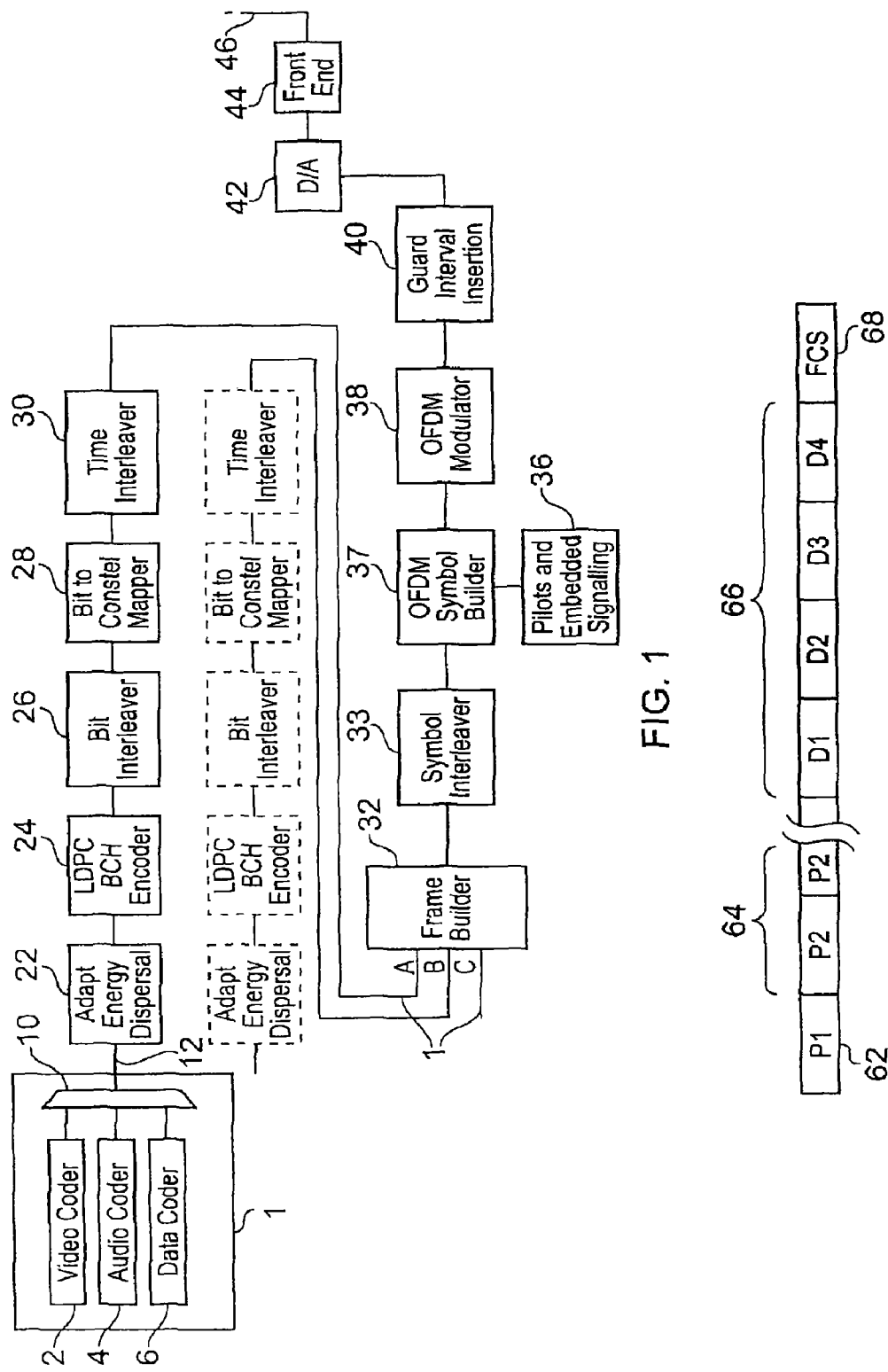

RECEIVER AND METHOD

FIELD OF THE INVENTION

The present invention relates to receivers and methods for receiving Orthogonal Frequency Division Multiplexed (OFDM) symbols, at least some of the OFDM symbols including a plurality of data bearing sub-carriers and a plurality of pilot bearing sub-carriers.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, use OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate an impulse response of the channel through which the OFDM symbol has passed, to facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy.

In some systems the position and properties of the pilot sub-carriers vary from OFDM symbol to OFDM symbol. It is therefore necessary to accommodate for these variations in the receiver to generate an accurate channel response of the channel.

SUMMARY OF INVENTION

According to an aspect of the present invention there is provided a receiver for receiving a sequence of OFDM symbols transmitted via a channel. Each OFDM symbol comprises a plurality of data bearing sub-carriers on which data is transmitted and a plurality of pilot bearing sub-carriers on which pilot data is transmitted. The pilot sub-carriers are distributed throughout the OFDM symbols of the sequence in accordance with a pilot sub-carrier pattern. The receiver includes a channel estimator, and the channel estimator includes a pilot data extractor for extracting pilot data from the pilot sub-carriers of each OFDM symbol; a pilot data extrapolator for generating extrapolated pilot data based on pilot data extracted from the pilot data sub-carriers; and a pilot data interpolator operable to process the pilot data by interpolating between the extrapolated pilot data in time and frequency to produce an estimate of the channel. The receiver also comprises a discontinuity detector for detecting a discontinuity in the pilot data processed by the channel estimator, and a controller, which upon detection of a pilot data discontinuity by the discontinuity detector, is operable to provide a control signal to the channel estimator which causes at least one of the pilot data extractor, the pilot data extrapolator and the pilot data interpolator to compensate for the pilot data discontinuity in the pilot data.

The pilot data extrapolator generates estimated samples of the channel from previously received extracted pilot data in the time and frequency domain.

In some embodiments the pilot data interpolator includes a frequency interpolator that interpolates in the frequency domain, and a temporal interpolator that interpolates in the time domain.

Some OFDM systems, such as DVB-T2, include a number of features which may give rise to discontinuities in pilot data extracted at the receiver. In order to accommodate for the discontinuity in the pilot data, according to an aspect of the invention, a detector is provided for detecting pilot data discontinuities at the receiver and a controller is provided for ensuring that upon detection of a discontinuity in the pilot data, at least one part of the channel estimator is adapted so as to accommodate for the discontinuity.

In one embodiment of the present invention, the discontinuity detector is operable to detect a discontinuity in the pilot data processed by the pilot data interpolator caused by an initialisation of the pilot data extrapolator resulting in a delay in generation of extrapolated pilot data. The controller is operable to send the control signal to the channel estimator which causes the pilot data interpolator to suspend channel estimation based on interpolation between previously extrapolated pilot data and current extrapolated pilot data, and instead produce channel estimates by frequency interpolation between extracted pilot data only, for a pre-determined period of time corresponding at least to a period of time required for the pilot data extrapolator to receive a sufficient number of OFDM symbols to begin producing extrapolated pilot data.

In some embodiments, the pilot data that has been interpolated in the frequency domain only and is fed back to the input of the pilot data extrapolator.

The pilot data extrapolator produces estimates of future pilot data based on pilot data extracted from previously received symbols. However, when the receiver is first initialised a delay is incurred before extrapolated pilot data (and thus channel estimates) can be produced because the pilot data interpolator needs previous pilot data from "previous" symbols from which to extrapolate future pilot data. Therefore in accordance with this example of the invention the control signal causes the pilot data interpolator to adapt its operation to generate channel estimates using frequency interpolation only (i.e. not undertaking any temporal interpolation which requires extrapolated pilot data) for a predetermined period of time. This means that channel estimates can be produced more quickly following an initialisation of the receiver.

In another embodiment of the present invention, the discontinuity detector is operable to detect a discontinuity in the pilot sub-carrier pattern in the received sequence of OFDM symbols. Upon detection of the discontinuity, the controller is operable to send the control signal to the channel estimator which causes the pilot data extractor, the pilot data extrapolator and the pilot data interpolator to suspend operation for a period of time corresponding to a predetermined number of OFDM symbols such that OFDM symbols comprising the pilot sub-carrier pattern discontinuity are not processed by the channel estimator.

As DVB-T2 includes frames of a different length, it is not always possible that the "phase" of the scattered pilot sub-carrier pattern is maintained from frame to frame. A disruption in pilot sub-carrier pattern phase may cause the failure of a conventional channel estimator which would not be able to keep track of the positions of the scattered pilot sub-carriers and instead interpret non-pilot sub-carriers as scattered pilot sub-carriers. Accordingly, by arranging the discontinuity detector to detect discontinuities in the pilot sub-carrier pattern, the operation of the channel estimator can be suspended at an appropriate time therefore reducing a likelihood of channel estimation failure.

In another embodiment of the present invention the discontinuity detector is arranged to detect if the pilot data discontinuity is the result of pilot data not being arranged in conformance with the pilot sub-carrier pattern or due to one or more OFDM symbols not including any pilot data. This may be the case if the sequence of received OFDM symbols includes a Future Extension Frame (FEF). Upon detection of pilot data not being arranged in conformance with the pilot sub-carrier pattern or due to one or more OFDM symbols not including any pilot data, the controller is operable to send the control signal to the channel estimator which causes the pilot data extractor, the pilot data extrapolator and the pilot data interpolator to suspend operation for a period of time corresponding to a predetermined number of OFDM symbols so that the OFDM symbols containing the discontinuous pilot data such as FEFs are not processed by the channel estimator.

Future Extension Frames (FEF) are undefined frames that have been included in the DVB-T2 standard so that equipment operating in accordance with the standard may be adapted in the future to accommodate new types of data frames. However, the inclusion of FEFs in a received DVB-T2 signal may disrupt the operation of the channel estimation by introducing pilot data discontinuities because the FEF may not conform to the currently defined pilot sub-carrier patterns or contain no pilot data at all. According to this aspect of the invention, this potential problem is overcome by suspending the operation of the channel estimator until the FEF has passed through the receiver.

In another embodiment of the present invention, the discontinuity detector is arranged to detect a received OFDM symbol comprising discontinuous pilot data on a pilot sub-carrier of a received OFDM symbol, the discontinuous pilot data being either inverted pilot data on a pilot sub-carrier that in previous OFDM symbols is non-inverted or non-inverted pilot data on a pilot sub-carrier that in previous OFDM symbols is inverted. Upon detection of the discontinuous pilot data, the controller is operable to send a signal to the channel estimator which causes the pilot data extractor, the pilot data extrapolator and the pilot data interpolator to suspend operation for a period of time corresponding to a predetermined number of OFDM symbols so that the discontinuous pilot data is not processed by the channel estimator.

DVB-T2 provides a so called "multiple input single output" (MISO) transmission mode in which two different versions of the DVB-T2 signal are broadcast from separate antennas. In the MISO mode, pilot sub-carriers on every other OFDM symbol transmitted from the second transmitter are inverted with respect to the pilot sub-carriers transmitted from the first transmitter. In some instances, this can lead to discontinuities in the types of pilot data (inverted or non-inverted) received from OFDM symbol to OFDM symbol in certain pilot sub-carrier positions. This can lead to problems when undertaking pilot data interpolation in the pilot data interpolator. In order to address this problem, upon detection of a discontinuous pilot data, the operation of the channel estimator is suspended for a predefined number of OFDM symbols so that the discontinuous pilot data is not processed by the channel estimator.

In another embodiment the discontinuity detector is arranged to detect discontinuous pilot data being either inverted pilot data on a pilot sub-carrier that in previous OFDM symbols is non-inverted or non-inverted pilot data on a pilot sub-carrier that in previous OFDM symbols is inverted as described above. However, in this embodiment the receiver includes a pilot copier which, upon detection of the discontinuous pilot data by the pilot data discontinuity detector, is arranged to adapt the OFDM symbol containing the discontinuous pilot data before it is processed by the channel estimator by replacing the discontinuous pilot data with pilot data from a pilot sub-carrier adjacent from the pilot sub-carrier on which the discontinuous pilot data is located.

As described above, in the MISO mode problems can arise due to discontinuous inverted/non-inverted pilot sub-carriers. In order to address this problem, a pilot copier is provided which replaces discontinuous pilot data with "non-discontinuous" pilot data from adjacent pilot sub-carriers before the OFDM symbol comprising the discontinuous pilot sub-carrier is processed by the channel estimator.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which:

FIG. 1 provides a schematic diagram showing a typical DVB-T2 transmitter chain;

FIG. 2 provides a schematic diagram indicating a typical DVB-T2 frame structure;

DETAILED DESCRIPTION

OFDM Transmitter and Receiver

Figure 3:
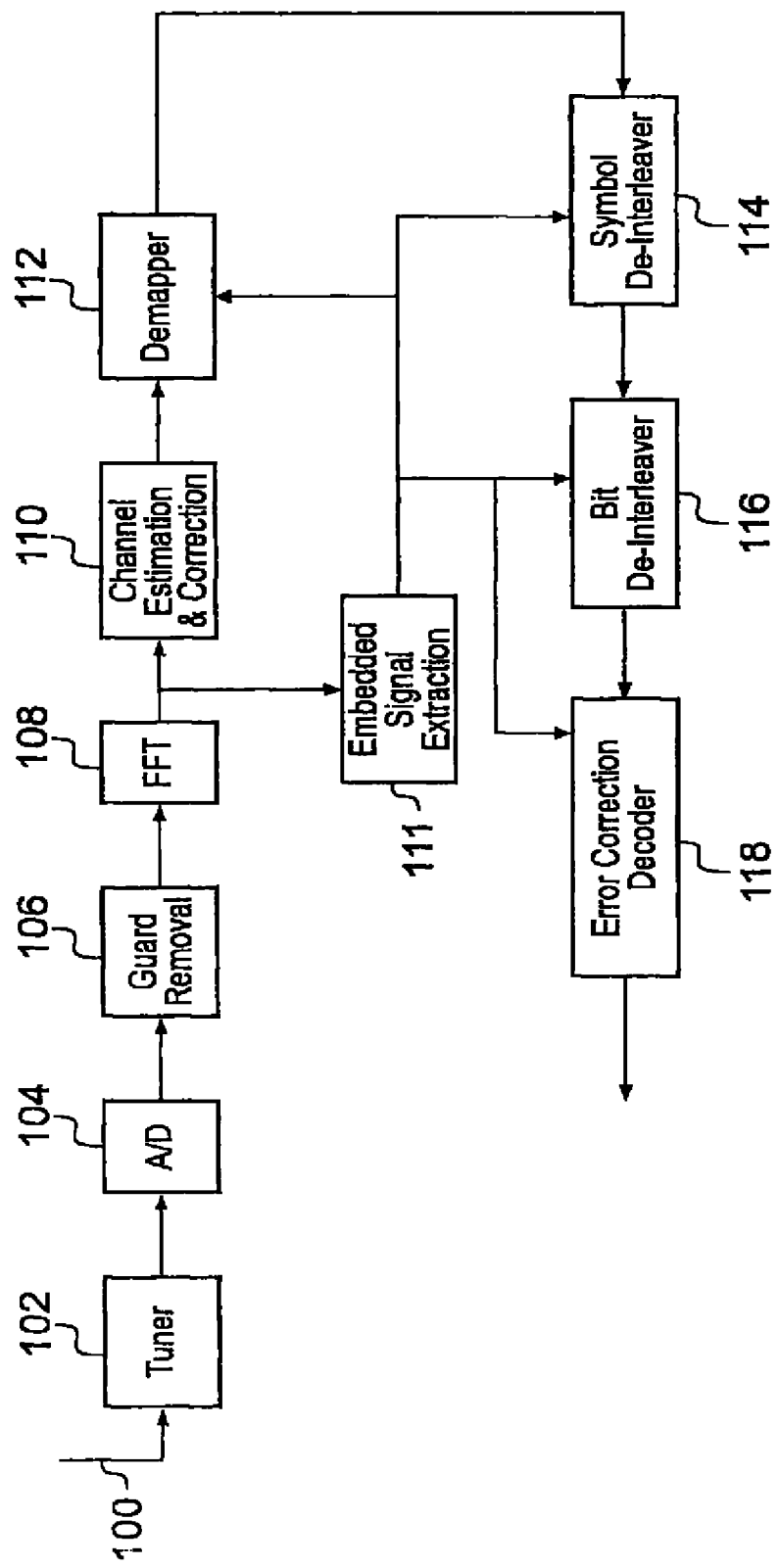
FIG. 3 provides a provides a schematic diagram showing a typical DVB-T2 receiver chain.

FIG. 1 provides an example block diagram of an OFDM transmitter which may be used for example to transmit video images and audio signals in accordance with the DVB-T2 standard. In FIG. 1 a program source 1 generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1, an OFDM transmitter receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data OFDM symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B and C in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1k, 2k, 4k, 8k, 16k or 32k, each of which provides a different number of sub-carriers according, for example to the following table:

TABLE 1

| Maximum Number of Sub-carriers per mode. | |
| --- | --- |
| Mode | Sub-carriers |
| 1K | 853 |
| 2K | 1705 |

TABLE 1-continued

| Maximum Number of Sub-carriers per mode. | |
| --- | --- |
| Mode | Sub-carriers |
| 4K | 3409 |
| 8K | 6913 |
| 16K | 13921 |
| 32K | 27841 |

The sequence of data cells to be carried in each OFDM symbol is then passed to the OFDM symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between OFDM symbols, and then to a digital to analogue converter 42 and finally to an RF amplifier within an RF front end 44 for eventual broadcast by the OFDM transmitter from an antenna 46.

For the DVB-T2 system, the number of sub-carriers per OFDM symbol can vary depending upon the number of pilot and other reserved sub-carriers. An example illustration of a "super frame" according to the DVB-T2 standard is shown in FIG. 2.

Thus, in DVB-T2, unlike in DVB-T, the number of sub-carriers for carrying data is not fixed. Broadcasters can select one of the operating modes from 1k, 2k, 4k, 8k, 16k, 32k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 OFDM symbol as shown in FIG. 2, which provides signalling information relating to the configuration of the DVB-T2 deployment, including an indication of the mode. The P1 OFDM symbol is followed by one or more P2 OFDM symbols 64, which are then followed by a number payload carrying OFDM symbols 66. The end of the physical layer frame is marked by a frame closing OFDM symbols (FCS) 68 (however, this is only if mode is not a straight frequency interpolation only mode and is not a PP8 pilot pattern as will be described below). The DVB-T2 frame structure is discussed in more depth below. For each operating mode, the number of sub-carriers may be different for each type of OFDM symbol. Furthermore, the number of sub-carriers may vary for each according to whether bandwidth extension is selected, whether tone reservation is enabled and according to which pilot sub-carrier pattern has been selected.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. As discussed further below, in some embodiments the received OFDM may be a combination of two versions of the OFDM symbol transmitted by two separate groups of antennas. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to an OFDM symbol de-interleaver 114, which operates to effect a reverse mapping of the received data OFDM symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

DVB-T and DVB-T2 OFDM symbols include pilot data which can be used at the receiver for synchronising and error correction. The pilot data is distributed across the sub-carriers of each OFDM symbol thus providing a number of pilot sub-carriers. Prior to transmission the pilot data is inserted on the pilot sub-carriers in each OFDM symbol at a boosted power level and at a known phase and amplitude. Therefore along with frame synchronisation and time synchronisation, the pilot data can be used by the receiver to estimate the channel response of the channel across which the OFDM symbol is transmitted. Once the receiver has an estimate of the channel response, the received OFDM symbols can be corrected to take account of the channel response. The pilot sub-carriers are typically distributed across the sub-carriers in each OFDM symbol and therefore variations in the channel response in both time and frequency can be estimated at the receiver. DVB-T and DVB-T2 differ in that, whereas DVB-T employs a single static pilot sub-carrier pattern, in DVB-T2 there are eight pilot sub-carrier patterns (PP1 to PP8), each of which has been designed to work optimally with a particular FFT size and guard interval combination.

Figure 4:
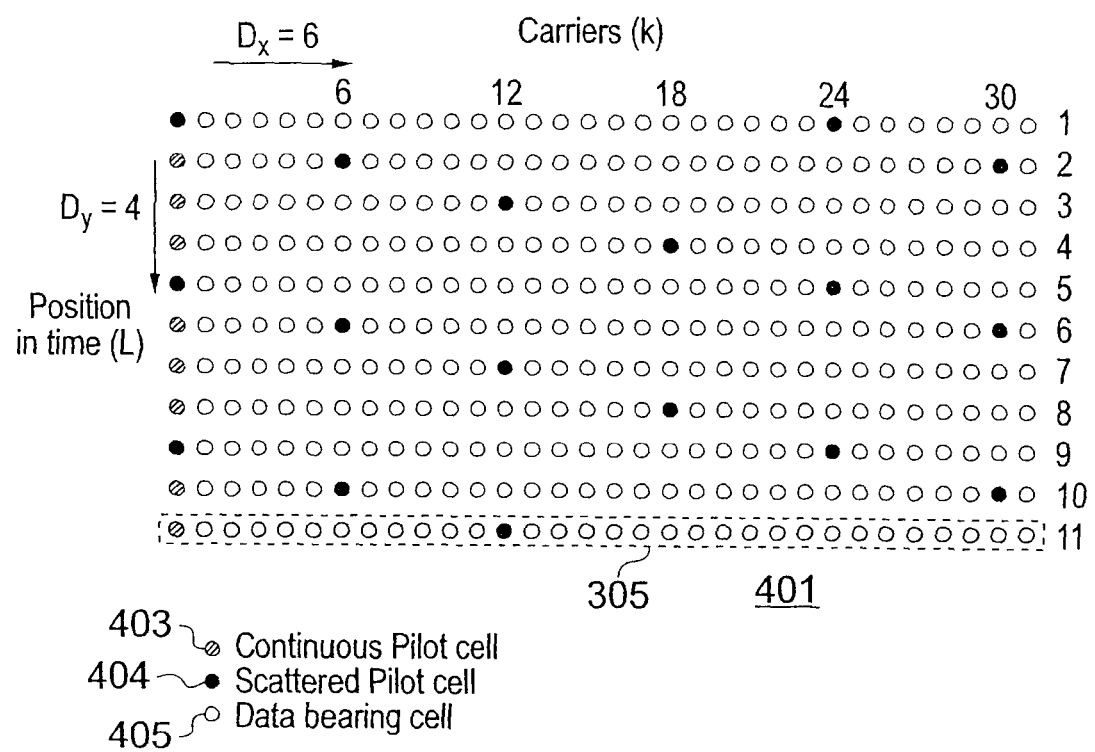
FIG. 4 provides a schematic diagram showing a generic OFDM symbol sequence.

DVB-T2 OFDM symbols include scattered pilot sub-carriers, continual pilot sub-carriers and edge pilot sub-carriers, the number and location of which are defined by one of the eight predefined pilot sub-carrier patterns. Continual pilot sub-carriers always occupy the same sub-carrier position within an OFDM symbol whereas the sub-carrier position of the scattered pilot sub-carriers vary from OFDM symbol to OFDM symbol. This concept is shown in FIG. 4. Edge pilot sub-carriers are positioned on the first and last sub-carrier of every OFDM symbol and are therefore continual sub-carrier pilots.

FIG. 4 shows the first thirty two sub-carriers of a sequence of OFDM symbols transmitted over a period of time. The OFDM symbols form a two dimensional grid 401 with OFDM sub-carriers (k) shown along the horizontal axis and OFDM symbol position in time (L) along the vertical axis. Each individual circle represents the value of a particular sub-carrier on a particular OFDM symbol. These are referred to as cells. Each horizontal row of cells 305 represents the first 32 sub-carriers of an OFDM symbol. As can be seen from the two dimensional array 401, the continual pilot sub-carriers 403 occupy the same cell in each OFDM symbol whereas the position of the scattered pilot sub-carriers 404 varies from OFDM symbol to OFDM symbol in a repeating cycle. The positions of the pilot sub-carriers are determined in accordance with the predefined pilot sub-carrier patterns discussed above. Each DVB-T2 pilot sub-carrier pattern is characterised by two values: Dx and Dy. Dx represents the spacing between scattered pilot sub-carriers on each OFDM symbol and Dy represents the number of OFDM symbols that separate OFDM symbols with scattered pilot sub-carriers in the same sub-carrier position. The OFDM symbol sequence shown in FIG. 4 shows the PP3 pilot sub-carrier pattern with Dx=6 and Dy=4.

Channel Estimation

In order for a receiver to successfully demodulate a sequence of OFDM symbols, such as that shown in FIG. 4, a sample of the channel response for each sub-carrier for each OFDM symbol (in other words each cell) should be estimated. The channel across which the OFDM symbols are transmitted will vary in frequency (i.e. the channel varies from sub-carrier to sub-carrier) and in time (i.e. the channel varies from OFDM symbol to OFDM symbol). An estimate of the channel corresponding to the position in time and frequency of the pilot sub-carriers 403, 404 shown in FIG. 4 can be derived simply by comparing their phase and amplitude with the known phase and amplitude at which they were transmitted. However, in order to provide channel estimates for the data bearing sub-carriers 405, the channel estimates derived from pilot data on the pilot sub-carriers must be used. This can be achieved by using a process including extrapolation and/or interpolation.

A channel estimate for data bearing sub-carriers situated between two pilot sub-carriers can be generated by interpolating between pilot data extracted from the two pilot sub-carriers. For some pilot sub-carrier patterns, it is enough to simply interpolate between the pilot sub-carriers on each OFDM symbol to produce a channel estimate for each data bearing sub-carrier. This interpolation between pilot sub-carriers on a single OFDM symbol amounts to interpolation in the frequency domain only and is therefore referred to as frequency interpolation. Whether or not frequency interpolation is possible is a function of whether or not there are enough pilot sub-carriers present on the OFDM symbol in question. This is because the pilot sub-carriers distributed throughout each OFDM symbol effectively amount to a discrete sampling of the channel. Therefore, the pilot sub-carriers distributed across the OFDM symbol must correspond to a sampling rate which is at least the Nyquist limit of the channel response across the range of frequencies represented by the sub-carriers. This is discussed further in section 5.4 of "*Implementation guidelines for a second generation digital terrestrial television broadcasting system (DVB-T2)*" DVB Document A133 February 2009.

Under some circumstances therefore, the pilot data from a single OFDM symbol does not provide enough information about the channel from which a reliable channel estimate for each sub-carrier can be generated. In this case, temporal-frequency interpolation can be employed. In temporal-frequency interpolation, pilot data from a number of adjacent OFDM symbols is used to provide further channel estimate data for a given OFDM symbol. However, temporal-frequency interpolation may require that pilot data from pilot sub-carriers on OFDM symbols which are yet to be received need to be considered. In this case, pilot data extrapolation can be employed. Temporal-frequency interpolation is explained further with reference to FIG. 4 and FIG. 5.

As explained above, FIG. 4 shows the first thirty two sub-carriers of a sequence of OFDM symbols conforming to the PP3 pilot sub-carrier pattern. The PP3 pilot sub-carrier pattern does not contain enough pilot sub-carriers to provide enough pilot data to allow reasonable channel estimation based on frequency only interpolation. In order to provide enough pilot data to perform interpolation between pilot sub-carriers on a single symbol, pilot data is needed at sub-carrier positions k=0, k=6, k=12, k=18, k=24, k=30 and so on (i.e. every sub-carrier on which a scattered pilot sub-carrier is present over the pilot sub-carrier pattern).

A most recently received OFDM symbol 305 is shown in FIG. 4 at L=11. As can be seen, on this recently received OFDM symbol, there are pilot sub-carriers at k=0 and k=12. However, in order to provide enough pilot data to perform a frequency interpolation between pilot sub-carriers, pilot data is ideally required at k=6, k=18, k=24 and k=30. In order to achieve this, pilot data from pilot sub-carriers from the previously received OFDM symbols are first used to obtain extrapolated pilot data. This is explained with reference to FIG. 5.

Figure 5:
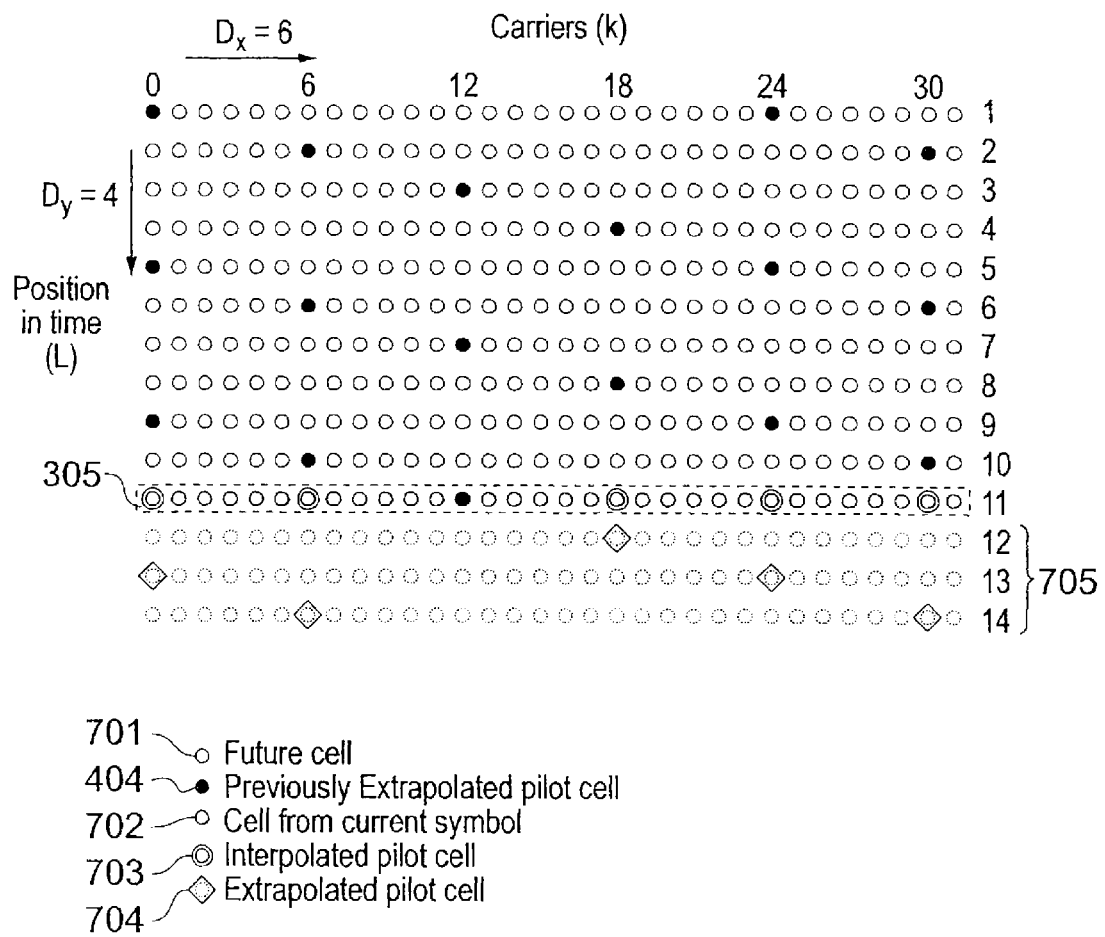
FIG. 5 provides a schematic diagram showing the typical DVB-T2 OFDM symbol sequence extrapolated and interpolated in order to generate a channel estimate.

FIG. 5 shows the OFDM symbol sequence of FIG. 4, but also including a section of as yet un-received "future" OFDM symbols 705 for which extrapolated pilot data has been generated and at sub-carrier positions 704 corresponding to the position at which future scattered pilot sub-carriers 404 will be located. The predicted pilot data is based on an extrapolation of the pilot data extracted from pilot sub-carriers from previous OFDM symbols.

Once the extrapolation of the pilot data has been performed and generated the predicted pilot data 704, then the pilot data required at sub-carrier positions k=0, k=6, k=12, k=18, k=24, k=30 can be generated by temporal interpolation.

Considering the sub-carrier at k=18 on the currently received OFDM symbol 305, an interpolated estimate of pilot data for sub-carrier k=18 is generated by temporally interpolating between the previously stored extrapolated pilot data at pilot sub-carrier position k=18 obtained for previous OFDM symbol L=8 and the predicted pilot data at sub-carrier position k=18 on the future OFDM symbol at L=12. Similarly, pilot data is generated at sub-carrier k=30 by a temporal interpolation between the previously stored extrapolated pilot data for sub-carrier k=30 on OFDM symbol L=10 and the predicted pilot data at sub-carrier position k=30 on the future OFDM symbol at L=14. In this way, pilot data can be generated for sub-carriers k=0, k=6, k=12, k=18, k=24, k=30. Once pilot data has been generated at these sub-carriers, a frequency interpolation can be carried as described above to provide a channel estimate for every sub-carrier.

A simple method of undertaking the temporal interpolation discussed above is using linear interpolation. This can be accomplished by first deriving two weighting factors, the first weighting factor based on the proximity in time of the current OFDM symbol to the nearest extrapolated pilot data estimate for a given sub-carrier, and the second weighting factor based on the proximity in time to the nearest received pilot sub-carrier for said given sub-carrier. For example, as can be seen in FIG. 5, for sub-carrier k=24, the nearest extrapolated pilot sub-carrier is at OFDM symbol L=13 and the nearest received pilot sub-carrier for sub-carrier 24 is at OFDM symbol L=9.

The following equations define weighting factors that can be used in the linear interpolation:

Interpolated output($I_{out}$)=($P_{weight}$×EP)+($M_{weight}$×MP)

$A_{pos}$=Actual time based position−L $P_{weight}$=1−($A_{pos}$/Dy)

Figure 6:
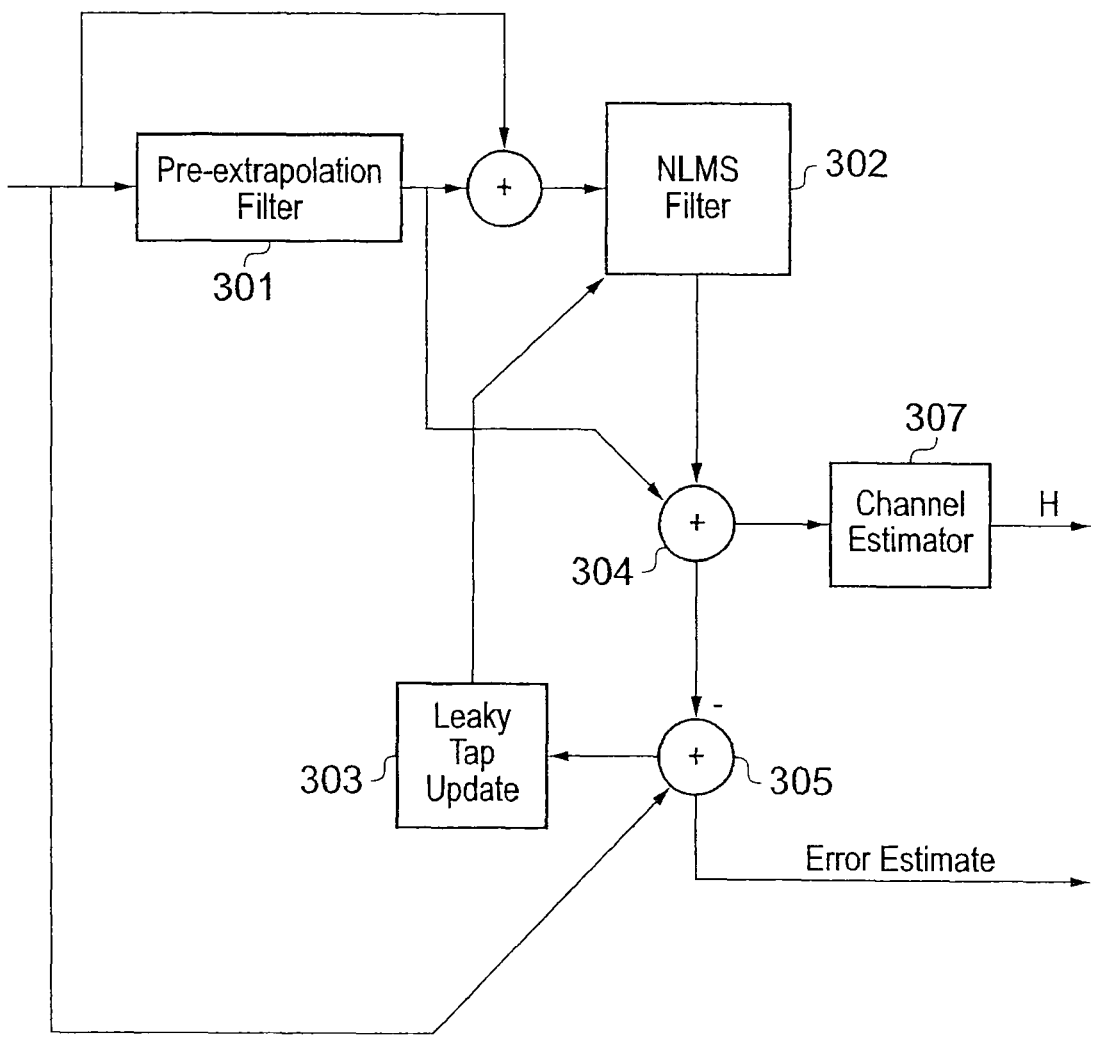
FIGS. 6 and 7 provides a schematic diagram of a channel estimator and corrector.

$M_{weight}$=($A_{pos}$/Dy)

where $P_{weight}$=first weighting factor defined by the proximity in time of the current OFDM symbol to the nearest extrapolated estimate for a given sub-carrier $M_{weight}$=second weighting factor defined by the proximity in time of the current OFDM symbol to the nearest received scattered pilot sub-carrier for said given sub-carrier EP=value of nearest extrapolated pilot sub-carrier on given sub-carrier MP=value of the previously stored extrapolated pilot sub-carrier on given sub-carrier $A_{pos}$=the proximity in time of the current OFDM symbol to the nearest extrapolated estimate for a given sub-carrier Implementation of a Conventional Receiver Including Channel Estimation FIG. 6 provides a schematic diagram of a channel estimator and corrector 110, which is part of the receiver, as shown in FIG. 3 which can perform the temporal-frequency interpolation process described above.

As shown in FIG. 6, pilot data is extracted from a received OFDM symbol by a pilot data extractor and input to a pre-extrapolation filter. The pre-extrapolation filter removes high frequency components of the input signal and, by subtracting this result from the input signal, reduces low frequency components of the signal before it is passed to a filter 302 (described further below). The pre-extrapolation filter enables fewer extrapolator taps to be used in the filter 302, leading to a smaller physical area required and reduced memory usage. In addition, the pre-extrapolation filter will also allow for faster convergence times, for example in static channels.

After processing by the pre-extrapolation filter, the OFDM symbol is then input to a normalised least mean squares (NLMS) pilot data extrapolation filter 302. The NLMS pilot data extrapolation filter 302 uses a least mean squares algorithm implemented as a series of taps to produce an estimate of the channel by de-correlating the additive noise from the pre-filtered input OFDM signal and also performs pilot data extrapolation. The channel estimator and corrector includes a leaky tap update unit 303 which is used so that the adaptive parameters of the NLMS pilot data extrapolation filter 302 are not subject to drift when the input OFDM symbol does not excite the filter to required levels. The noise de-correlated estimate of the OFDM symbol output from the NLMS pilot data extrapolation filter 302 is added to the output of the pre-extrapolation filter via an adder 304. This result is input to a channel estimation unit 307. The channel estimation unit 307 undertakes the temporal and frequency interpolation processes described above and outputs a channel estimate H. Extrapolated estimates for scattered pilots that are in-phase are not modified by the channel estimation unit 307.

The channel estimator and corrector includes a second subtractor 305 which is arranged to subtract the noise de-correlated OFDM symbol directly from the input OFDM symbol to give an error estimate output. This can be used by other parts of the receiver as a noise estimate and thus a signal to noise ratio (SNR) per sub-carrier can be derived by dividing the channel estimate power by the noise estimate power.

Figure 7:
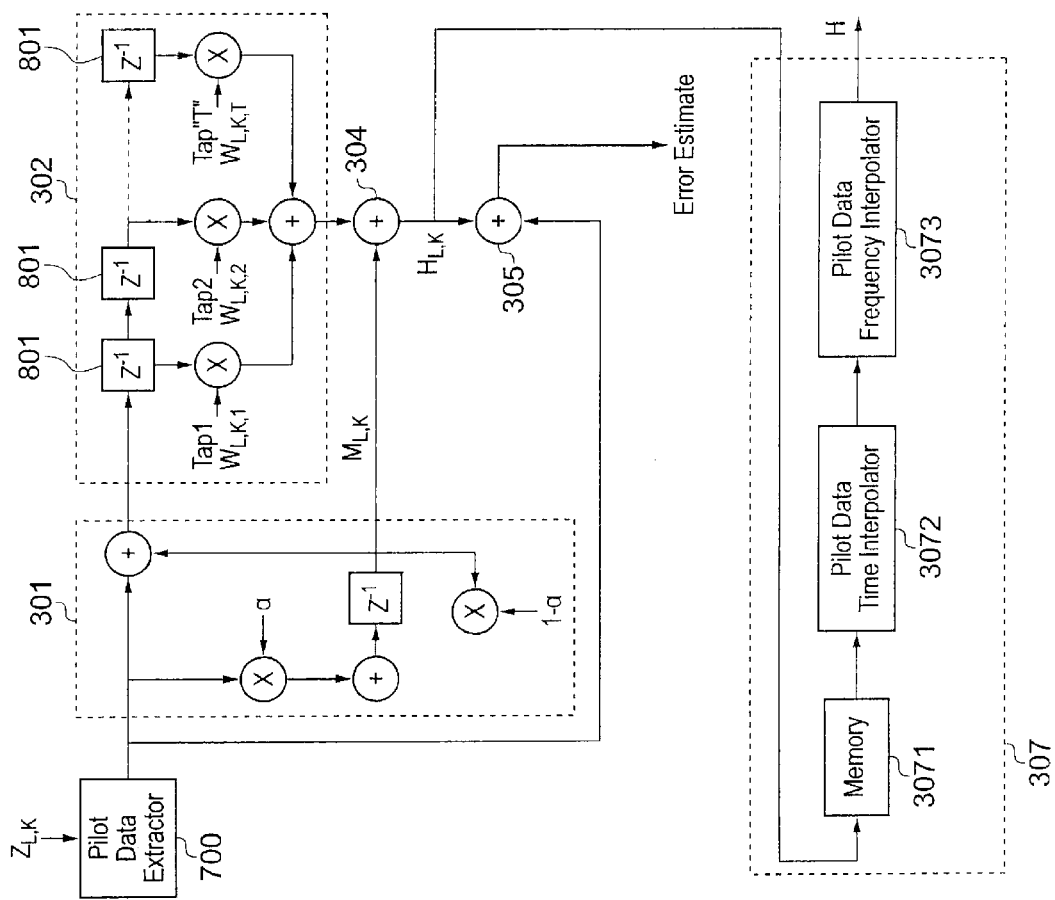

A schematic diagram providing a more detailed implementation of the conventional channel estimator and corrector shown in FIG. 6 is provided in FIG. 7.

FIG. 7 includes a more detailed view of the NLMS pilot data extrapolation filter 302 showing for example the taps and delay units 801 that form the series of filters. There are a total of T taps with coefficients W, and T delays 801. In operation, the first step is to initialise tap coefficients $W_{LK1}$ to $W_{LKT}$ of the NLMS pilot data extrapolation filter 302 to zero. A more detailed view of the channel estimation unit 307 is also provided. The channel estimation unit 307 comprises a pilot data time interpolator 3072. The memory element 3071 stores the previous extrapolated channel estimate input from the adder 304 when the scattered pilots are in-phase and provides interpolated pilots for scattered pilot carriers that are out-of-phase. The channel estimation unit 307 also includes a pilot data frequency interpolator 3073 for interpolating the pilot data to produce a channel estimate H, as described above.

Channel Estimation With Pilot Data Discontinuity Detector

Figure 8:
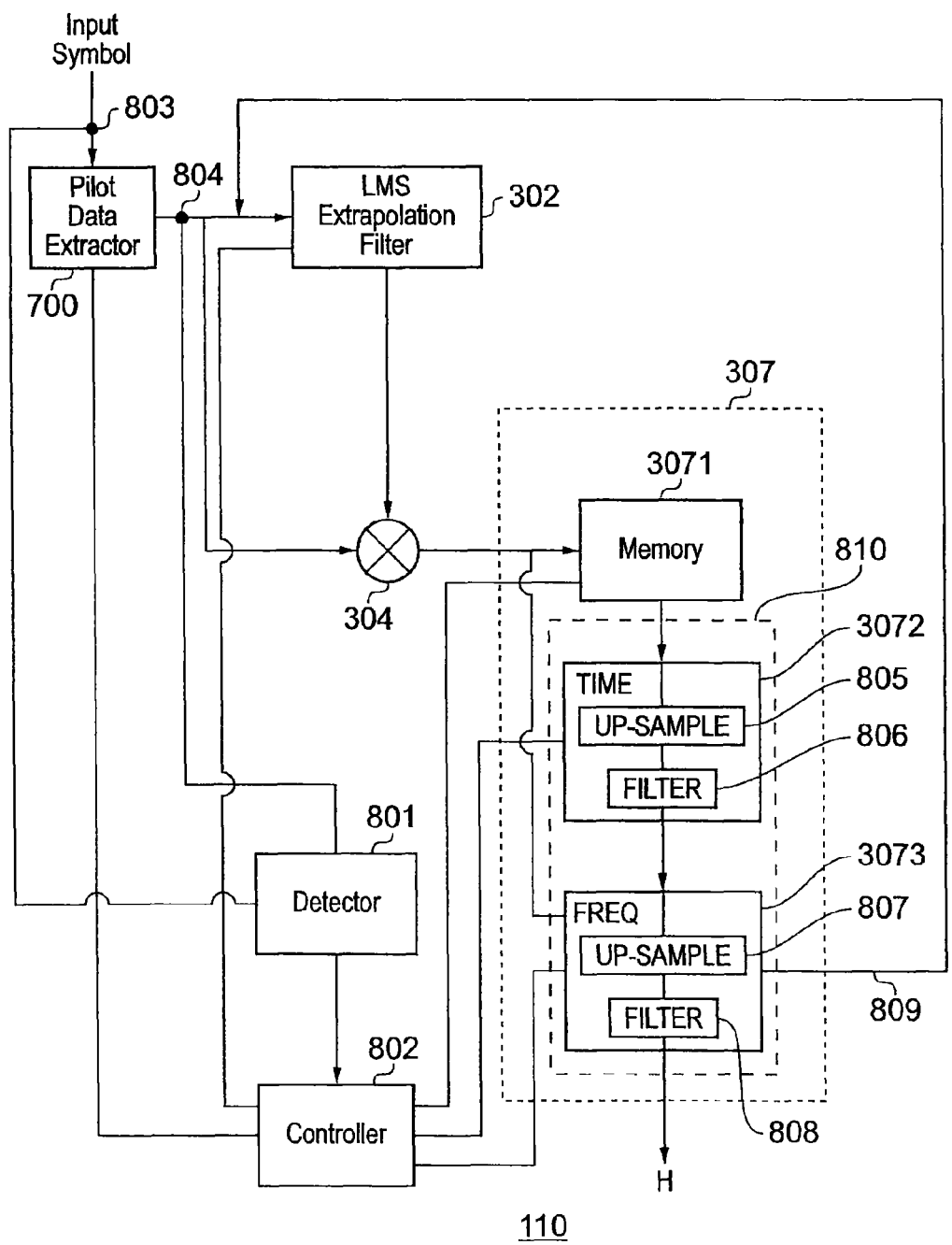
FIG. 8 provides a schematic diagram of a channel estimator and corrector arranged in accordance with the present invention.

As described above, some OFDM systems contain certain features which may give rise to pilot data discontinuities in the pilot data extracted at the receiver. FIG. 8 shows a schematic diagram of a channel estimator and corrector 110 arranged in accordance with the present technique. The channel estimator and corrector 110 include a pilot data extractor 700 for obtaining noisy channel estimates which require post processing, an NMLS pilot data extrapolation filter 302 for de-correlating received OFDM symbols from channel noise and extrapolating the pilot data, and a channel estimation unit 307 including a pilot data time interpolator 3072, a memory element 3071 and a pilot data frequency interpolator 3073. The pilot data extrapolation filter 302 and the channel estimation unit 307 are all generally arranged in accordance with the channel estimator and corrector 110 shown in FIGS. 6 and 7. In some embodiments the pilot data time interpolator and the pilot data frequency interpolator may be provided within a single pilot data interpolation unit 810. The memory element 3071 is arranged to store pilot data extrapolated from previously received OFDM symbols. The memory element 3071 is only updated per symbol for scattered pilot carriers that are in-phase, and time-dimensioned interpolated for filling in the gaps for scattered pilot carriers that are out-of-phase. The pilot data temporal interpolator 3072 may include an up-sampling filter 805 and a low pass filter 806 for producing the temporal interpolated pilot data from the extrapolated pilot data produced by the NLMS pilot data extrapolation filter 302. The pilot data frequency interpolator 3073 may include an up-sampling filter 807 for up-sampling the pilot data received from the pilot data interpolator 3072 to produce a channel estimate at all the sub-carrier positions. The pilot data frequency interpolator 3073 may also include a low pass filter 808 for filtering the channel estimate result. Similarly the pilot data time frequency interpolator 3072 may include an up-sampling filter 805 to up sample the pilot data input from the memory 3071 and a low pass filter 806 to filter interpolated pilot data to be input to the pilot data frequency interpolator 3073. However, in some embodiments, the pilot data time interpolator 3072 and the pilot data frequency interpolator 3073, rather than including an up-sampling filter and a low pass filter to perform the interpolation of the pilot data, will instead include means, such as a processor, to perform the linear interpolation described above. The channel estimator and corrector 110 shown in FIG. 8 also includes a pilot data discontinuity detector 801 and a controller 802. The detector 801 is arranged to detect a discontinuity in the pilot data of the OFDM symbols processed by the system. The detector is connected to various points within the channel estimator and corrector 110 including a first connection 803 to a point at which the input OFDM symbol enters the channel estimator and corrector 110 and a second connection 804 to an output of the pilot data extractor 700. However, these connection points are only examples. As will become clear, any suitable connection point from which relevant information regarding pilot data discontinuity can be derived is envisaged. The channel estimator and corrector 110 also includes a controller 802 connected to the detector 801. The controller 802 is arranged so that upon detection of a pilot data discontinuity, appropriate control signals can be sent to one or more of the pilot data extractor 700, NLMS pilot data extrapolation filter 302, the pilot data time interpolator 3072, the memory 3071 or the pilot data frequency interpolator 3073, to cause these components of the channel estimator to adapt their operation to accommodate the pilot data discontinuity. A number of examples of pilot data discontinuity encountered by the channel estimator and corrector 110 and the adaptation of the components of the channel estimator and corrector 110 to accommodate these discontinuities are described below.

Pilot Data Extrapolator Output Discontinuity

As described above, the NLMS pilot data extrapolation filter 302 produces estimates of future pilot data based on pilot data extracted from previously received OFDM symbols. This extrapolation enables temporal-frequency interpolation based channel estimates to be produced. However, when the channel estimator and corrector 110 is first initialised a delay is incurred before extrapolated pilot data (and thus channel estimates) can be produced because the NLMS pilot data extrapolation filter 302 needs previous pilot data from "previous" symbols from which to extrapolate future pilot data in the time domain. Thus there is essentially a requirement for an amount of memory in a system which forms an extrapolation function. For example, if the pilot data extrapolator comprises 6 taps and the pilot sub-carrier pattern is PP8 (Dx=6, Dy=16), a total of 96 symbols will need to be received before the pilot data extrapolator has enough pilot data to begin extrapolation (Dy×number of taps in pilot data extrapolator). Therefore, if the pilot data frequency interpolator 3073 is to wait before the NLMS pilot data extrapolation filter 302 is ready to output extrapolated pilot data, there will be a delay of at least 96 symbols before channel estimates can be produced.

In one embodiment of the present invention, the detector 801 is arranged to detect a likely discontinuity in the pilot data caused by the initialisation delay of the NLMS pilot data extrapolation filter 302 by detecting an initialisation of the channel estimator and corrector 110, for example by the receipt of a first OFDM symbol. For the example of DVB-T2 this could be the P1 symbol. The detector 801 is then operable to communicate this detected initialisation to the controller 802. The controller 802 then sends a control signal to the pilot data frequency interpolator 3073. The control signal causes the pilot data frequency interpolator 3073 to adapt its operation to accommodate for the pilot data discontinuity. In one example, upon receipt of the control signal the pilot data frequency interpolator is arranged to generate channel estimates using frequency interpolation only, accepting its inputs from the pilot data extractor unit 700 (i.e. not undertaking any temporal interpolation which requires extrapolated pilot data) for a predetermined period of time and passing the relevant sub-carriers back to the input of the NLMS pilot data extrapolation filter 302 via connection 809. The predetermined period of time corresponds at least to the period of time required for the NLMS pilot data extrapolator 302 to receive a sufficient number of OFDM symbols to begin producing extrapolated pilot data in the time domain. In this example, in the case of pilot sub-carrier pattern PP8, the channel estimation unit 307 will be ready to begin producing channel estimates within 6 OFDM symbols instead of 96.

Future Extension Frame Discontinuity

Figure 9:
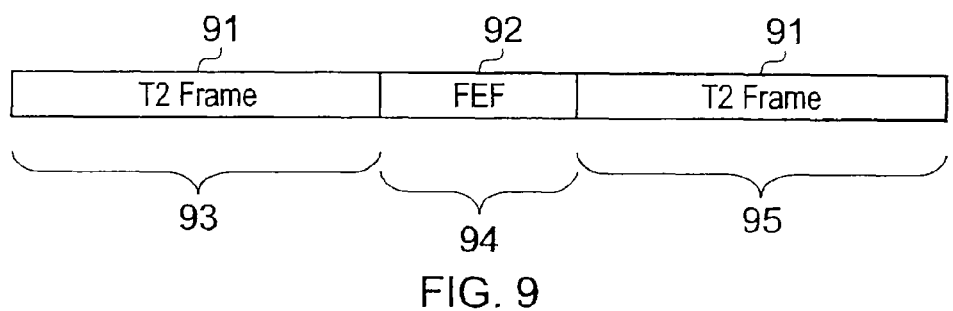
FIGS. 9 and 10 provide schematic diagrams indicating typical DVB-T2 frame structures.

Future Extension Frames (FEF) are undefined frames that have been included in the DVB-T2 standard so that equipment operating in accordance with the standard may be adapted in the future to accommodate new types of data frames. FIG. 9 illustrates how this is implemented. As can be seen, an FEF 92 is inserted between two standard T2 frames 91. The inclusion and location of FEFs in a DVB-T2 super frame is indicated by signalling data inserted in the P1 and P2 OFDM symbols.

The inclusion of FEFs in a received DVB-T2 signal may include discontinuities in pilot data and disrupt channel estimation system because there is no guarantee that the FEFs will conform to the currently defined pilot schemes and/or may contain no pilot data at all. Nevertheless, receivers operating in accordance with the DVB-T2 standard must be able to accommodate OFDM frame sequences including FEFs.

In some examples of the present invention, the detector 801 is arranged to detect FEFs input to the channel estimator and corrector 110. Upon detection of the FEF, the detector is arranged to send a signal to the controller which sends a control signal to the pilot data extractor 700, the NLMS pilot data extrapolator 302 and the pilot data frequency interpolator 3073. The control signal causes the pilot data extractor 700, the NLMS pilot data extrapolation filter 302 and the pilot data frequency interpolator 3073 to suspend operation for a period of time sufficient to ensure that no data from the FEFs are input to the channel estimation unit 307. In some examples this period of time may be equal to the temporal length of the FEF. This concept is illustrated in FIG. 9. During first period 93 and third period 95 corresponding to regular T2 frames, the channel estimation unit 307 operates normally. However, during second period 94 corresponding to a FEF, the operation of the channel estimation unit 307 is suspended.

Pilot Pattern Discontinuity

Figure 10:
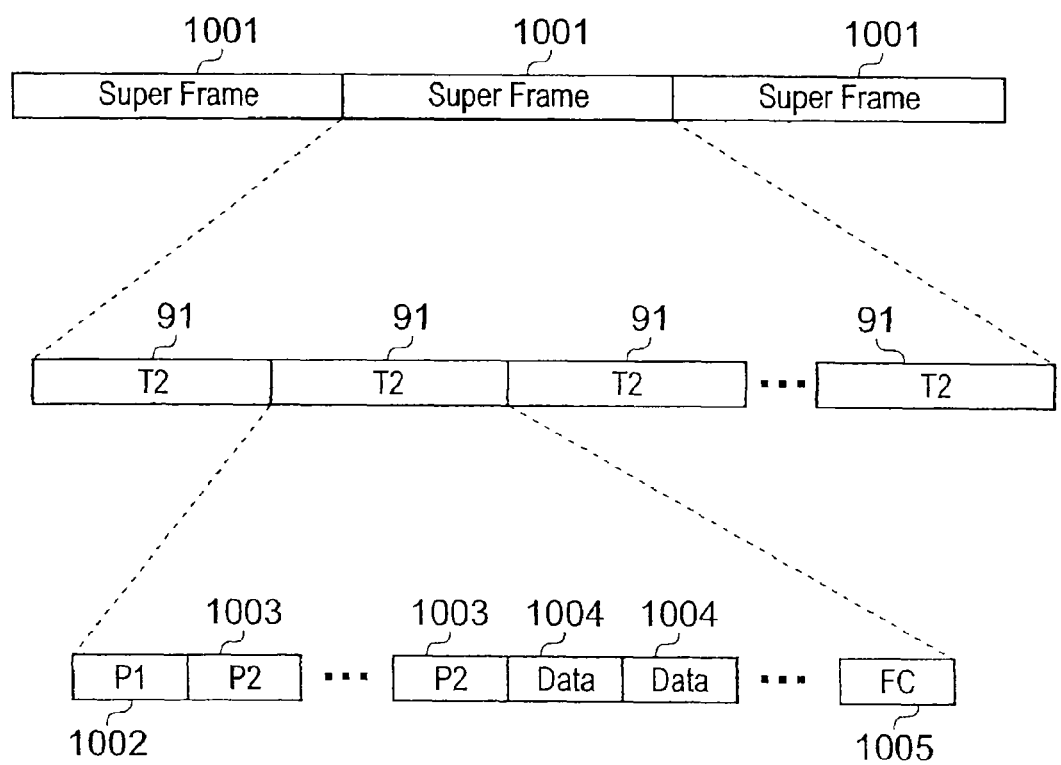

FIG. 10 provides an illustration of a DVB-T2 frame structure (FEF are not shown). As can be seen, the frame structure consists of a sequence of super frames 1001, each super frame 1001 in turn consisting of a number of T2 frames 91. The T2 frames each comprise a number of OFDM symbols. Each T2 frame begins with a P1 signalling OFDM symbol 1002, which is followed by at least one P2 signalling OFDM symbol 1003 and then a sequence of data OFDM symbols 1004 which terminate in a frame closing OFDM symbol 1005. In DVB-T2, frames are independent of each other and may be of variable length. Accordingly, there is no guarantee that pilot sub-carrier patterns will be continuous from one frame to the next. Moreover, if the number of OFDM symbols in a T2 frame is not a multiple of Dy, then there will be a scattered pilot discontinuity between T2 frames as the repeating cycle of scattered pilot sub-carriers is only completely cycled through every Dy OFDM symbols.

Figure 11:
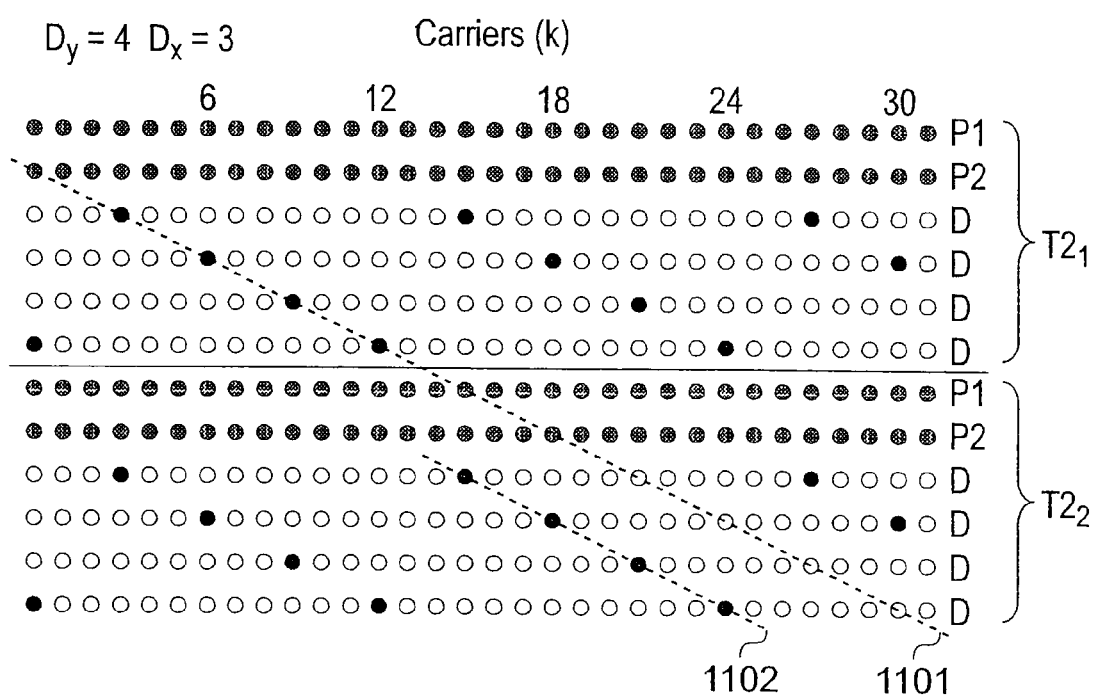
FIG. 11 provides a schematic diagram showing two T2 frames forming a typical DVB-T2 OFDM symbol sequence.

An example of pilot sub-carrier pattern discontinuity is explained further with reference to FIG. 11

FIG. 11 shows an example of a pilot sub-carrier pattern where Dy=4 and Dx=3. The first six OFDM symbols represent a first T2 frame T2$_1$ and the second six OFDM symbols represents a second T2 frame T2$_2$. As can be seen, when the second T2 frame T2$_2$ begins, the "phase" (i.e. the position of the first scattered pilot sub-carrier) is "reset". A first line 1101 shows an extrapolated plane along which scattered pilot sub-carriers would be located if the repeating cycle of the pilot sub-carrier pattern of the second frame T2$_2$ was a unbroken continuation of the pilot sub-carrier pattern of the first frame T2$_1$. A second line 1102 shows the actual plane along which pilot carriers are located. As will be appreciated, if an unmodified DVB-T channel estimator were to receive the OFDM symbols shown in FIG. 11, it would continue to extract and store data from cells of the second frame T2$_2$ through which the first line 1101 bisects. Should the channel estimation system go on to interpret the values extracted from these cells as pilot data, the channel estimation would no longer be able to provide reliable scattered pilot interpolation and the system would fail.

In one example, the detector 801 is arranged to detect any pilot sub-carrier pattern discontinuity arising from the transition between frames. This could be based on P1 and/or P2 frame signalling data or any other suitable method. Upon detection, the detector 802 communicates that a discontinuity has been detected to the controller 802. The controller 802 is then operable to send a control signal to the pilot data extractor 700 which causes the pilot data extractor 700 to "reset" the scattered pilot phase to zero at the beginning of every frame. In other words, as soon as a new frame begins to be processed, the pilot data extractor 700 and the NLMS pilot data extrapolation filter extractor 302 switches from extracting and processing data from cells positioned along the first plane 1101 as pilot data to extracting data from cells positioned along the second plane 1102 as pilot data. This ensures that pilot data is correctly extracted from pilot sub-carriers rather than normal data being extracted from normal data bearing sub-carriers and incorrectly interpreted as pilot data.

In another example, the detector 801 is again arranged to detect the transition between frames and communicate this to the controller 802. The controller 802 is then operable to send control signals to the pilot data extractor 700, the NLMS pilot data extrapolation filter302 and the pilot data frequency interpolator 3073 which causes them to suspend their operation during the processing of OFDM symbols occurring during frame transitions which result in a pilot sub-carrier pattern discontinuity. The concept of suspending the operation of all the parts of channel estimation unit 307 in this context is illustrated in FIG. 12.

Figure 12:
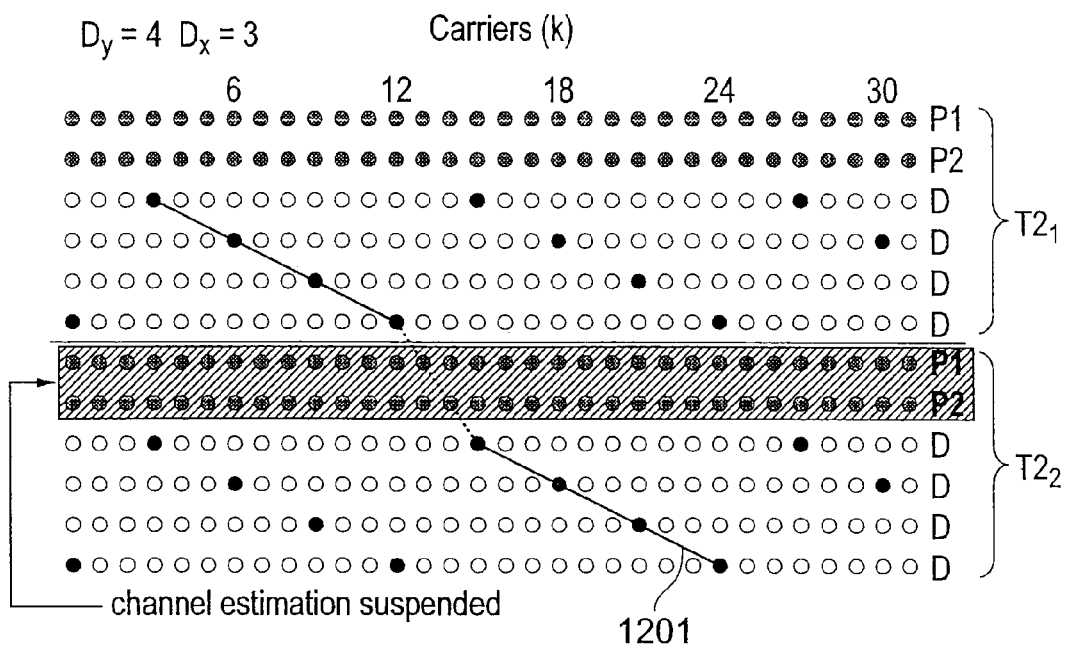
FIG. 12 provides a schematic diagram illustrating suspension of channel estimation between the two T2 frames shown in FIG. 11.

FIG. 12 shows the same OFDM symbol sequence as illustrated in FIG. 11. During the first two OFDM symbols of the second frame T2$_2$, operation of the channel estimation unit 307 has been suspended. As can be seen from the scattered pilot plane 1201, the next position in which the pilot data extractor 700 is expecting a pilot sub-carrier is at sub-carrier k=15. By suspending operation of the channel estimation unit 307 over the first two OFDM symbols, the position of the next pilot sub-carrier once the channel estimation unit 307 and thus the pilot extractor 700 begins operation again is at k=15 and therefore pilot sub-carrier pattern continuity is maintained.

The maximum number of OFDM symbols over which the operation of the pilot data extractor 700, the NLMS pilot data extrapolation filter302 and the pilot data frequency interpolator 3073 will be suspended is Dy-1. Accordingly, for pilot sub-carrier patterns PP1, PP3, PP5 and PP7, the maximum period of time during which operation of these parts of the channel estimator and corrector is suspended will be three OFDM symbols. Similarly, for pilot sub-carrier patterns PP2, PP4 and PP6 the maximum period of time during which operation is suspended will be one OFDM symbol. Pilot sub-carrier pattern PP8 will result in a maximum period of suspension of fifteen OFDM symbols. In some examples, during periods over which operation is suspended, the tap coefficient of the NLMS pilot data extrapolation filter 302 should not be updated, and error estimation should be suspended (leaving the noise power estimate unchanged).

MISO Mode

DVB-T2 provides a so called "multiple input single output" (MISO) transmission mode. In the MISO transmission mode, two different versions of the DVB-T2 signal are broadcast from separate antennas. This transmission diversity means that a signal received at a receiver will have passed through two different channels. The fact that the original data will have been transmitted across more than one channel can be exploited at the receiver in order to produce a more robust version of the original data. In DVB-T2 this is achieved by applying a modified Alamouti code to adjacent sub-carriers in each OFDM symbol. This is explained in further depth in DVB Bluebook A133, section 9.3.3. However, the concept is illustrated at a simple level in FIG. 13.

Figure 13:
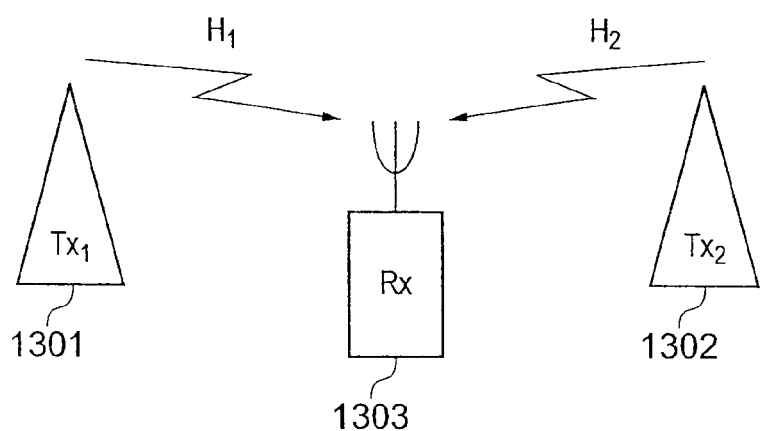
FIG. 13 provides a schematic diagram of a MISO transmission system.

FIG. 13 shows a schematic diagram of a first transmitter (or group of transmitters) 1301 and a second transmitter (or group of transmitters) 1302 which transmit data to a DVB-T2 receiver 1303 over a first channel $H_1$ and a second channel $H_2$ respectively. In accordance with the Alamouti coding, on even numbered OFDM symbols pilot data is transmitted in the same phase from both sets of transmitters. On odd numbered OFDM symbols the pilots are inverted when broadcast from the second transmitter (or group of transmitters) 1302.

In implementing the DVB-T2 MISO mode, the following differences are realised between the OFDM symbols transmitted from the first transmitter (or group of transmitters) 1301 and the second transmitter 1302 (or group of transmitters):

Pilot data on scattered pilot sub-carriers is inverted on odd numbered OFDM symbols from the second transmitter (or group of transmitters);

Pilot data from P2 OFDM symbols from the second transmitter 1302 are inverted on sub-carriers having indices that are odd multiples of three;

Pilot data from edge pilot sub-carriers from the second transmitter 1302 are inverted on odd numbered OFDM symbols;

Pilot data on continual pilot sub-carriers from the second transmitter 1302 that coincide with scattered pilot sub-carriers are inverted only if the pilot data of the scattered pilot sub-carriers are inverted, otherwise they are left unchanged;

For frame closing OFDM symbols and data OFDM symbols, pilot data on scattered pilot sub-carriers from the second transmitter 1302 are inverted on alternate scattered pilot sub-carriers.

Demodulation of a received DVB-T2 OFDM symbol which has been transmitted in the MISO mode is defined by the following equations:

$$H_1(n) = \frac{g_n + g_{n+1}}{2}$$
$$H_2(n) = \frac{g_n - g_{n+1}}{2}$$

where
$H_1$=channel impulse response of the first channel,
$H_2$=channel impulse response of the second channel,
n=scattered pilot carrier,
n+1=Adjacent scattered pilot carrier to scattered pilot carrier n
$g_{(n)}$=sum of both channels at scattered pilot carrier n
$g_{(n+1)}$=difference of both channels at scattered pilot carrier n Pilot data on OFDM sub-carrier n are effectively the sum of the pilot data at those pilot sub-carriers from both transmitters, while the pilot data on OFDM sub carrier n+1 are effectively the difference of the pilots at those sub-carrier positions from both transmitters (achieved via an inversion of the pilots on one transmitter). So, averaging the sum of two adjacent scattered pilots on OFDM sub-carriers n and n+1 respectively will provide the channel estimate for the first transmitter 1301 at the scattered pilot sub-carrier position on OFDM sub-carrier n. Whereas, averaging the difference of the same adjacent pilots on OFDM sub-carrier n and n+1 will provide the channel estimate for the second transmitter 1302 at the scattered pilot position on OFDM sub-carrier n. The channel estimation unit 307 can be adapted to estimate the channel in this way during MISO transmission mode. As will be appreciated, this means that in order to determine the value of scattered pilots at sub-carrier positions n+1 interpolation must be employed based on the scattered pilot values on sub-carrier positions n+1.

MISO Mode Pilot Discontinuity

As in the channel estimation shown in FIG. 5, in the MISO transmission mode, the channel estimation unit 307 still has to provide a channel estimate for every sub-carrier position in a sequence of received OFDM symbols. This is shown in FIG. 14*a* and FIG. 14*b*.

Figure 14A:
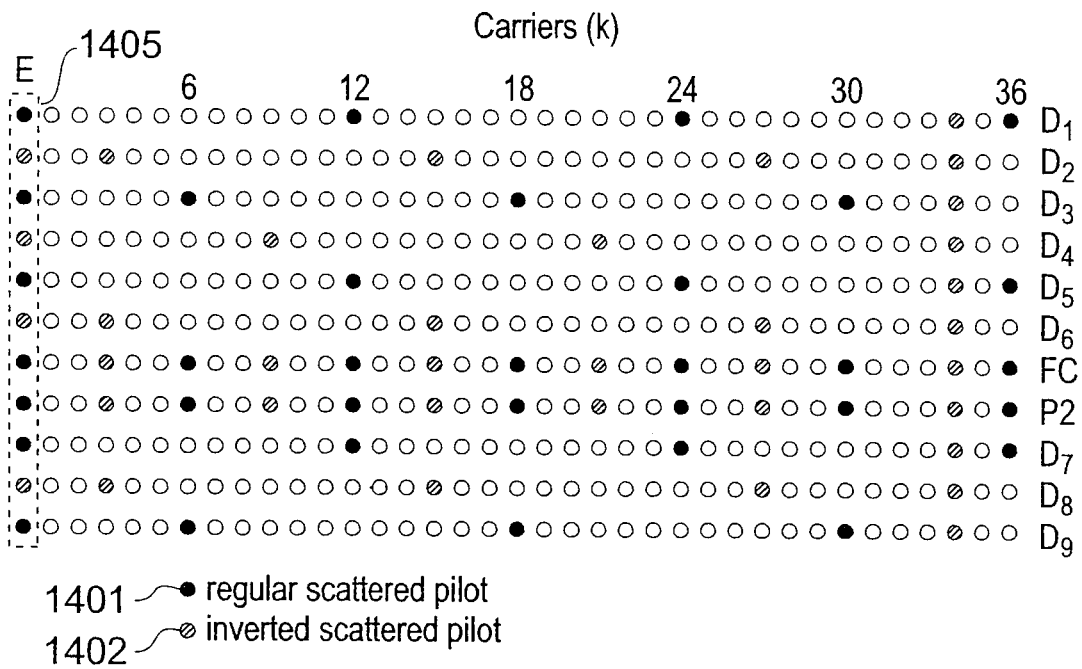
FIGS. 14*a* and 14*b* provide schematic diagrams indicating pilot sub-carrier extrapolation and interpolation in a DVB-T2 MISO OFDM symbol sequence.
Figure 14B:
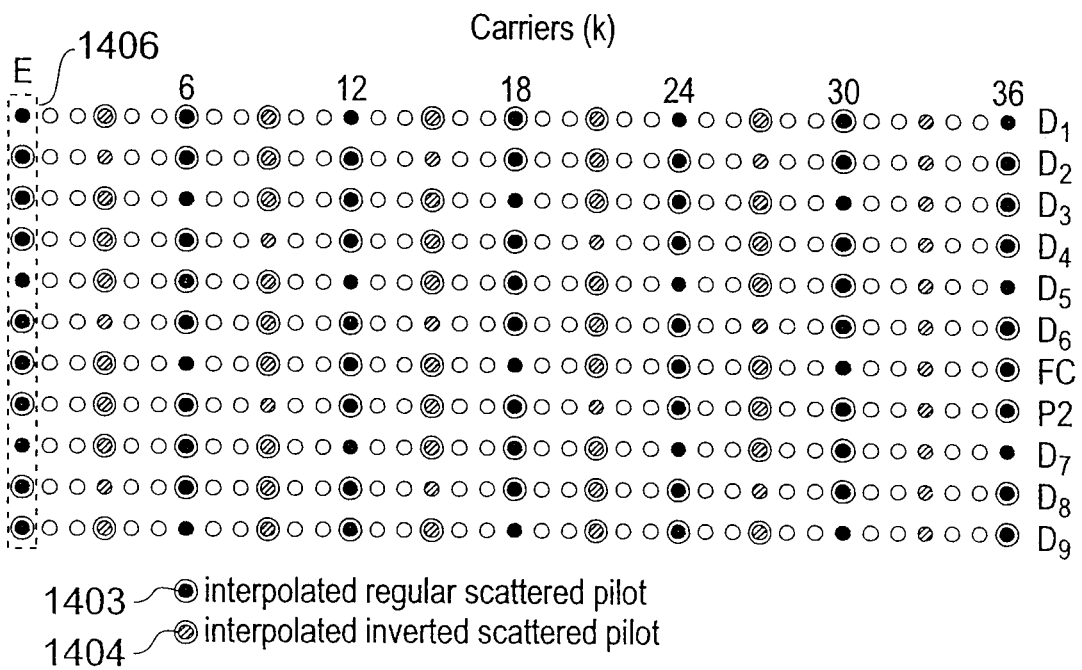

FIG. 14*a* shows the first thirty seven sub-carriers of a typical MISO mode OFDM symbol sequence. FIG. 14*b* shows the same sequence of OFDM symbols after the pilot data has been extracted by the pilot data extractor 700 and interpolated by the pilot data time interpolator 3072. Non-inverted pilot data 1401 transmitted on even numbered OFDM symbols are shown as solid black circles, the inverted pilot data 1402 transmitted on odd numbered OFDM symbols are shown as hatched circles. As will be appreciated, in order to provide enough pilot data for reliable channel estimation, the "missing" pilot sub-carrier positions on sub-carriers k=3, 6, 9, 12, 15, 18, 21, 24, 30 and 36 must be filled with pilot data based on an interpolation of the extracted pilot data. This is achieved by temporal interpolation between pilot data for each sub-carrier and can be undertaken by the channel estimation unit 307 in the same way as described above. FIG. 14*b* illustrates the concept of temporal interpolation for MISO mode transmission. Interpolated non-inverted pilot data cells 1403 are shown as black circles with an outer circle and interpolated inverted pilot data cells 1404 are shown as hatched circles with an outer circle. As can be seen from FIG. 14*a*, each pilot sub-carrier, with the exception of the sub-carrier 1405 containing edge pilot sub-carriers, contains pilot data of only one type, either non-inverted or inverted. This makes interpolation possible in these sub-carriers. As explained above, the edge pilot sub-carrier conventionally comprise continual pilot sub-carriers. However, in this example of the MISO mode, the edge pilot sub-carrier 1405 contains discontinuous pilot data in that both non-inverted scattered pilot data 1401 and inverted scattered pilot data 1402 are present. Therefore, the edge pilots can no longer be considered as continuous pilots in the pilot data time interpolator 3072. However, this problem can be mitigated, as shown in the edge pilot sub-carrier 1406 in FIG. 14*b*, by interpolating between the non-inverted pilot data extracted from the non-inverted scattered pilot sub-carriers to fill the cell positions that were originally occupied by inverted pilot data. As will be appreciated, it would be equally possible to interpolate between the extracted inverted scattered pilot data to fill the cell positions that were originally occupied by non-inverted pilot data.

MISO Mode Pilot Phase Inversion Discontinuity

Figure 15A:
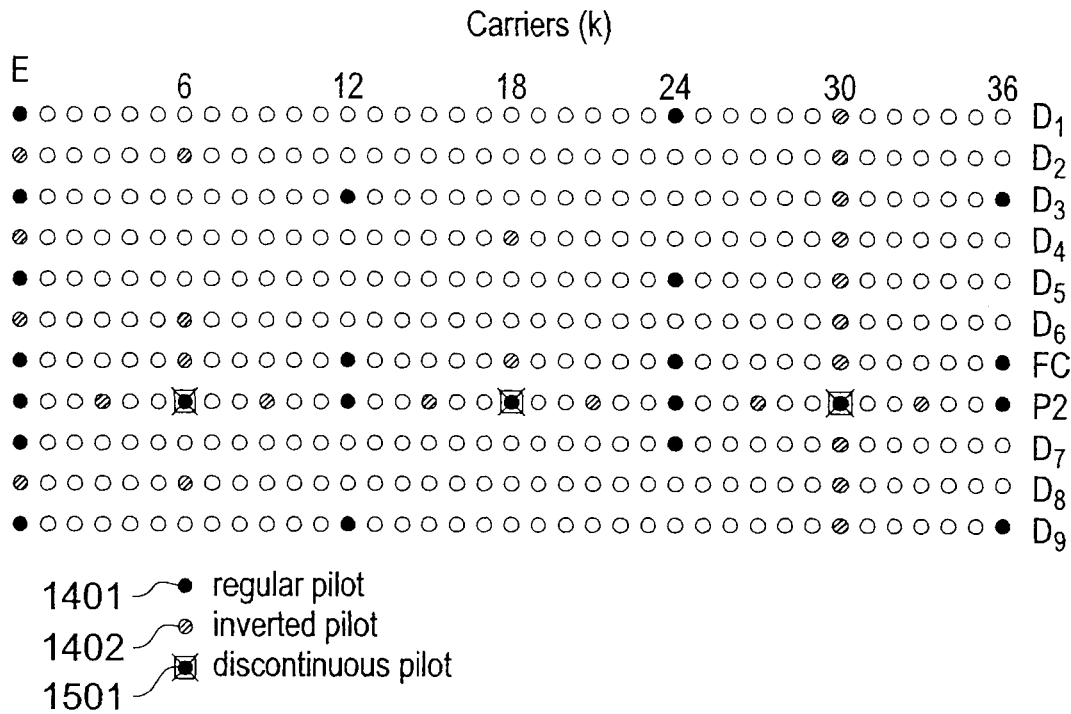
FIGS. 15a and 15b provide schematic diagrams indicating pilot sub-carrier inversion discontinuity in a DVB-T2 MISO OFDM symbol sequence.

A further problem arising during channel estimation when in the MISO mode is the occurrence of pilot phase inversion discontinuity. FIG. 15*a* shows sub-carriers k=0 to k=36 of a sequence of received OFDM symbols transmitted in MISO mode using the PP3 pilot sub-carrier pattern. As can be seen, the pilot sub-carriers 1501 from the P2 OFDM symbol on sub-carriers k=6, k=18 and k=30 contain non-inverted pilot data, whereas the rest of the pilot sub-carriers 1402 on sub-carriers k=6, k=18 and k=30 contain inverted pilot data. The fact that both inverted and non-inverted pilot data is present in sub-carriers k=6, k=18 and k=30 means there will be a potential discontinuity during temporal interpolation of pilot data extracted from these sub-carriers.

Figure 15B:
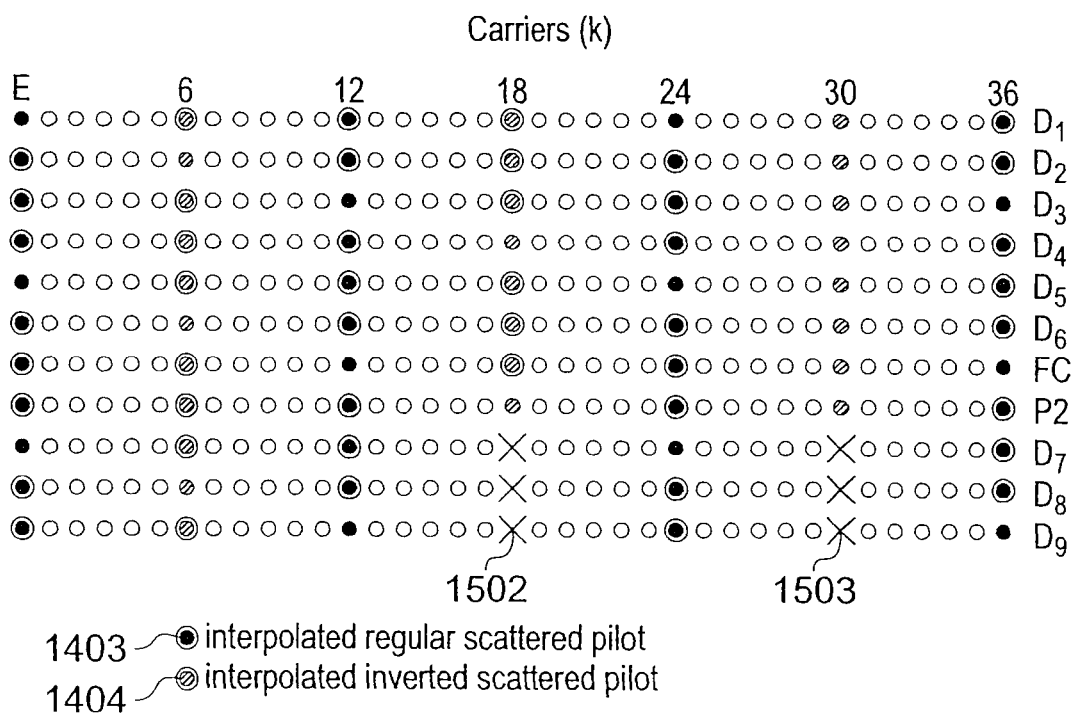

As explained above, in order to perform temporal interpolation, pilot data extracted from pilot bearing sub-carriers (sub-carriers k=6, 12, 18, 24 and 36 in FIG. 15*a*) is used to generate interpolated pilot data between OFDM symbols for sub-carrier positions which do not contain pilot data. So, for example, in FIG. 15*a*, the pilot data extracted from the pilot sub-carrier at k=6 on the frame closing OFDM symbol FC and the pilot data extracted from the pilot sub-carrier at k=6 on data OFDM symbol $D_8$ are interpolated between to generate interpolated pilot data estimates for the sub-carrier positions k=6 for OFDM symbol $D_7$. However, the additional complication in MISO mode is that the pilot data extracted from the two pilot sub-carriers which is used to generate the interpolation must both be either non-inverted or inverted. If one is inverted and one is non-inverted, the result of the interpolation will be corrupted. FIG. 15*b* shows an example of how this corruption may happen if the OFDM symbol sequence shown FIG. 15a was processed by a conventional channel estimator.

At sub-carriers k=18, k=30, the pilot sub-carriers of the P2 OFDM symbol fall on sub-carriers that the pilot sub-carrier pattern dictates would otherwise be used as one of the pair of pilot sub-carriers from which pilot data is extracted to generate the extrapolated pilot data. As these P2 pilot sub-carriers are discontinuous, the interpolated output 1502 beyond the P2 OFDM symbol for sub-carrier k=18 and interpolated output 1503 for sub-carrier k=30 will be corrupted.

In one example of the present invention the corrupted output 1502, 1503 shown in FIG. 15b can be avoided by suspending the operation of the channel estimation unit 307 to prevent any discontinuous pilot data being extracted from offending P2 OFDM symbols. In this example the detector 801 is arranged to detect P2 OFDM symbols and also sub-carriers containing discontinuous pilot data. This could be based on P1 and/or P2 frame signalling data or any other suitable method. The detection is then communicated to the controller 802 which is then operable to send control signals to all the parts of the channel estimator 110: the pilot data extractor 700, the NLMS pilot data extrapolation filter 302 and the pilot data time interpolator 3073 which causes them to suspend their operation for a period of time long enough to prevent the discontinuous pilot data from being processed by the channel estimation unit 307.

Figure 16:
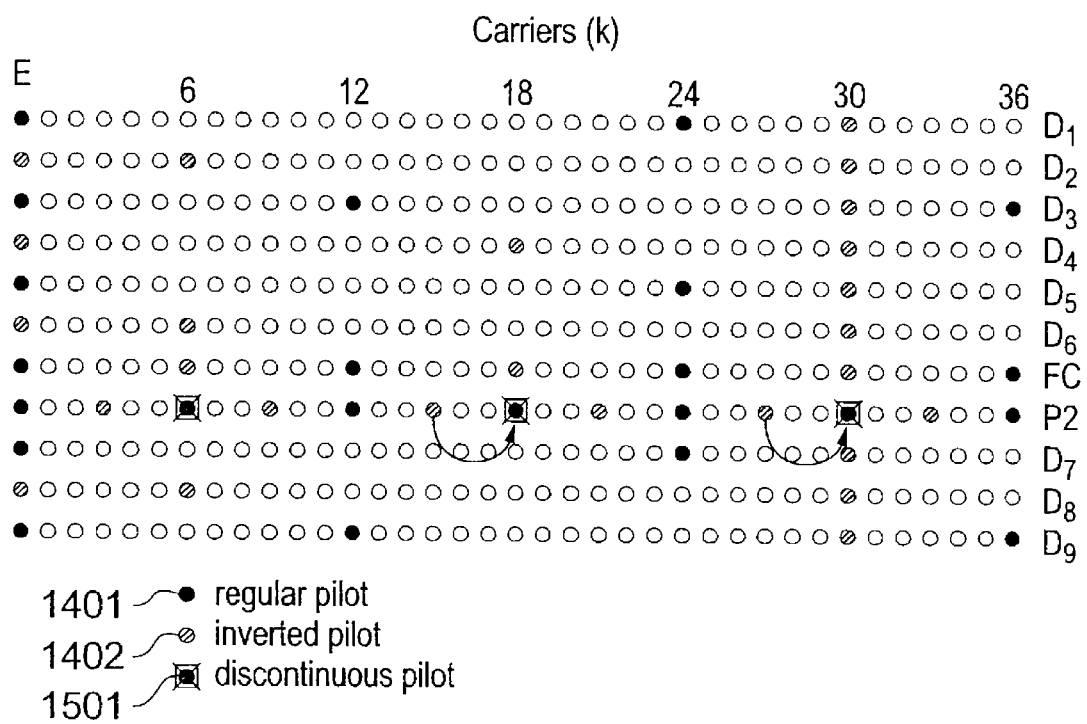
FIG. 16 provides a schematic diagram indicating the operation of an inverted pilot copier on a DVB-T2 MISO OFDM symbol sequence.

In another example of the present invention discontinuous pilot data is copied from adjacent pilot sub-carriers containing inverted pilot data into the offending pilot sub-carriers. This concept is illustrated in FIG. 16. FIG. 16 shows the MISO OFDM symbol sequence shown in FIG. 15a. However, as can be seen, the P2 pilot data from pilot sub-carrier at k=15 has been copied into the P2 pilot sub-carrier k=18 originally containing discontinuous pilot data. Similarly, the inverted pilot data from pilot sub-carrier k=27 has been copied into the pilot sub-carrier at k=30 which originally contained discontinuous pilot data.

Figure 17:
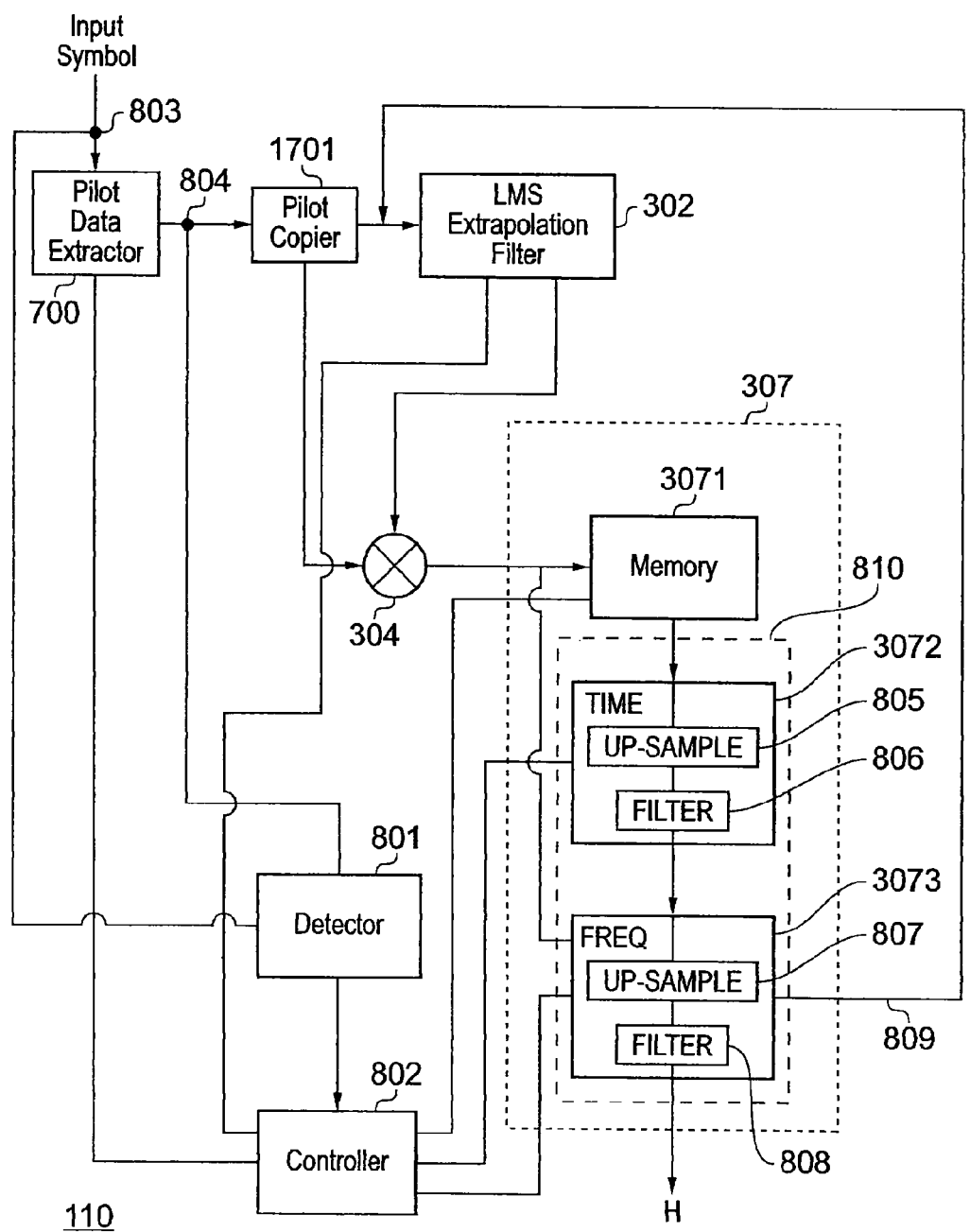
FIG. 17 provides a schematic diagram showing a channel estimator and corrector arranged in accordance with an example of the present invention, and FIG. 18 provides a flow diagram summarising a method according to the present invention.

Typically this process will be undertaken before being processed by the NLMS pilot data extrapolation filter 302 or the channel estimation unit 307. In one example this method finds application in MISO mode transmission due to the fact that in the MISO mode, the channels are assumed to be unchanging between two adjacent OFDM symbols. FIG. 17 provides a schematic diagram of a channel estimator and corrector 110 arranged to implement this process. FIG. 17 shows a channel estimator and corrector 110 similar to that shown in FIG. 5 except that in this channel estimator and corrector 110 a pilot copier 1701 is arranged to process all incoming OFDM symbols. The detector 801 is arranged to detect P2 OFDM symbols and sub-carriers containing discontinuous pilot data. This is communicated to the controller 802 which is arranged to send a control signal to the pilot copier 1701 which copies the pilot data as described above when offending P2 pilots are detected.

Summary of Operation

Figure 18:
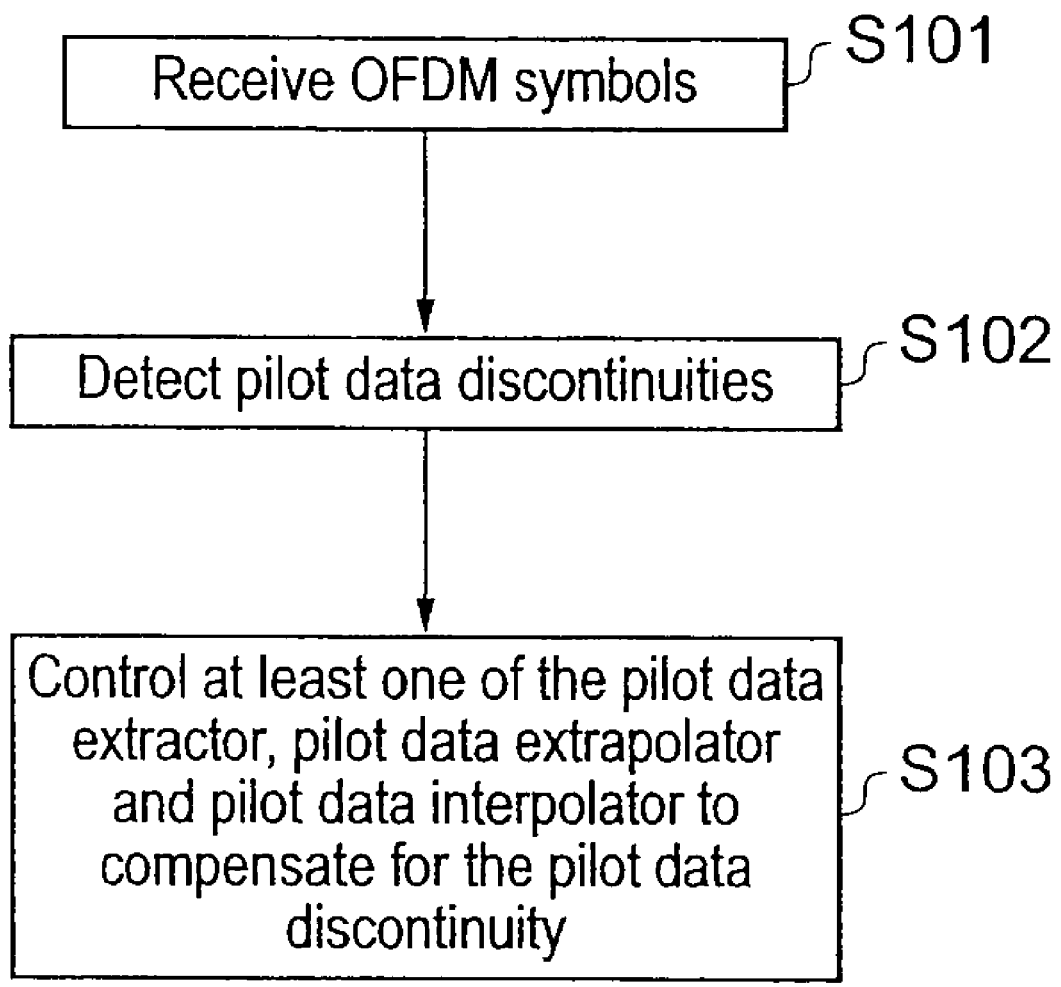

FIG. 18 provides a flow diagram showing steps of a method according to the present technique. At step S101, OFDM symbols are received at the receiver, at step S102, any pilot data discontinuities are detected. At step S103, at least one of the pilot data extractor, pilot data extrapolator, pilot data time interpolator and pilot data frequency interpolator are controlled to compensate for the pilot data discontinuity.

Various modifications may be made to the embodiments herein before described. For example it will be understood that the particular component parts of which the channel estimator described above is comprised, for example the linear interpolator, the NLMS filter and the channel estimator unit are logical designations. Accordingly, the functionality that these component parts provide may be manifested in ways that do no conform precisely to the forms described above and shown in the diagrams. For example aspects of the invention be implemented in the form of a computer program product comprising instructions that may be implemented on a processor stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Embodiments of the present invention may also find application with other appropriate transmission standards such as the cable transmission standard known as DVB-C2. For the example of DVB-C2, it will be appreciated that the OFDM symbols are not transmitted and received via a radio frequency sub-carrier, but via cable and so an appropriate adaptation of the transmitter and receiver architecture can be made. However, it will be appreciated that the present invention is not limited to application with DVB and may be extended to other standards for transmission or reception, both fixed and mobile.

The invention claimed is:

1. A receiver for receiving a sequence of Orthogonal Frequency Division Multiplexed (OFDM) symbols transmitted via a channel, each OFDM symbol comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the receiver comprising:

a channel estimator which includes
a pilot data extractor that extracts pilot data from the pilot sub-carriers of each OFDM symbol,
a pilot data extrapolator that generates extrapolated pilot data based on pilot data extracted from the pilot data sub-carriers, and
a pilot data interpolator operable to process the pilot data by interpolating between the extrapolated pilot data in time and frequency to produce an estimate of the channel;
a discontinuity detector that detects a discontinuity in the pilot data contained within the received OFDM symbols; and
a controller which upon detection of a pilot data discontinuity by the discontinuity detector is operable to provide a control signal to the channel estimator which causes at least one of the a pilot data extractor, the pilot data extrapolator and the pilot data interpolator to compensate for the pilot data discontinuity in the pilot data.

2. A receiver for receiving a sequence of Orthogonal Frequency Division Multiplexed (OFDM) symbols transmitted via a channel, each OFDM symbol comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the receiver comprising:

a channel estimator which includes
a pilot data extractor that extracts pilot data from the pilot sub-carriers of each OFDM symbol, a pilot data extrapolator that generates extrapolated pilot data based on pilot data extracted from the pilot data sub-carriers, and a pilot data interpolator operable to process the pilot data by interpolating between the extrapolated pilot data in time and frequency to produce an estimate of the channel;

a discontinuity detector operable to detect a discontinuity in the pilot data processed by the pilot data interpolator caused by an initialization of the pilot data extrapolator resulting in a delay in generation of extrapolated pilot data; and a controller operable to provide a control signal to the channel estimator upon detection of a pilot data discontinuity by the discontinuity detector which causes the pilot data interpolator to suspend channel estimation based on interpolation between previously extrapolated pilot data and current extrapolated pilot data, and to produce channel estimates by frequency interpolation between extracted pilot data only for a pre-determined period of time corresponding at least to a period of time required for the pilot data extrapolator to receive a sufficient number of OFDM symbols to begin producing extrapolated pilot data.

3. A receiver according to claim 1, wherein the discontinuity detector is operable to detect a discontinuity in the pilot sub-carrier pattern in the received sequence of OFDM symbols and upon detection of the discontinuity, the controller is operable to send the control signal to the channel estimator which causes the pilot data extractor, the pilot data extrapolator and the pilot data interpolator to suspend operation for a predetermined period of time corresponding to a number of OFDM symbols such that OFDM symbols comprising the pilot sub-carrier pattern discontinuity are not processed by the channel estimator.

4. A receiver according to claim 3, wherein the discontinuity in the pilot sub-carrier pattern arises due to pilot data not being arranged in conformance with the pilot sub-carrier pattern or arises due to one or more OFDM symbols not including any pilot data.

5. A receiver according to claim 4, wherein the pilot data not being arranged in conformance with the pilot sub-carrier pattern or one or more OFDM symbols not including any pilot data is due to the sequence of received OFDM symbols including a Future Extension Frame (FEF), wherein the predetermined period of time during which the operation of the pilot data extractor, the pilot data extrapolator and the pilot data interpolator is suspended corresponds to a predetermined number of OFDM symbols so that OFDM symbols from the FEF are not processed by the channel estimator.

6. A receiver according to claim 1, wherein the discontinuity detector is operable to detect a discontinuity in the pilot sub-carrier pattern in which a distribution of pilot sub-carriers on a first OFDM symbol does not correspond to the pilot sub-carrier pattern with respect to a distribution of pilot sub-carriers from OFDM symbols preceding the first OFDM symbol, and upon detection of the discontinuity, the controller is operable to send a control signal to the channel estimator which causes the pilot data extractor to extract the pilot data from the pilot sub-carriers of the first OFDM symbol rather than from sub-carriers where pilot data would be located if the first OFDM symbol conformed to the pilot sub-carrier pattern.

7. A receiver according to claim 1, wherein the discontinuity detector is arranged to detect a received OFDM symbol comprising discontinuous pilot data on a pilot sub-carrier of a received OFDM symbol, the discontinuous pilot data being either inverted pilot data on a pilot sub-carrier that in previous OFDM symbols is non-inverted or non-inverted pilot data on a pilot sub-carrier that in previous OFDM symbols is inverted, and upon detection of the discontinuous pilot data, the controller is operable to send a signal to the channel estimator which causes the pilot data extractor, the pilot data extrapolator and the pilot data interpolator to suspend operation for a period of time corresponding to a predetermined number of OFDM symbols so that the discontinuous pilot data is not processed by the channel estimator.

8. A receiver according to claim 1, wherein the discontinuity detector is arranged to detect a received OFDM symbol containing discontinuous pilot data on a pilot sub-carrier of a received OFDM symbol, the discontinuous pilot data being either inverted pilot data on a pilot sub-carrier that in previous OFDM symbols is non-inverted or non-inverted pilot data on a pilot sub-carrier that in previous OFDM symbols is inverted, and the receiver includes a pilot copier which upon detection of the discontinuous pilot data is arranged to adapt the OFDM symbol containing the discontinuous pilot data before it is processed by the filter and the channel estimator by replacing the discontinuous pilot data with pilot data from a pilot sub-carrier adjacent from the pilot sub-carrier on which the discontinuous pilot data is located.

9. A receiver according to claim 1, wherein the sequence of OFDM symbols have been transmitted in accordance with a Digital Video Broadcasting (DVB) standard such as Digital Video Broadcasting-Cable 2 (DVB-C2).

10. A method of estimating a channel response of a channel via which data frames comprising a sequence of Orthogonal Frequency Division Multiplexed (OFDM) symbols received at a receiver have been transmitted, each OFDM symbol comprising a plurality of data bearing sub-carriers on which data is transmitted and a plurality of pilot bearing sub-carriers on which pilot data is transmitted, the pilot sub-carriers being arranged within the OFDM symbols of the sequence in accordance with a pilot sub-carrier pattern, the method comprising extracting pilot data from the pilot sub-carriers of each OFDM symbol;

generating extrapolated pilot data based on pilot data extracted from the pilot data sub-carriers;

processing the pilot data by interpolating between the extrapolated pilot data in time and frequency to produce an estimate of the channel; and detecting any discontinuity in the pilot data contained within the received OFDM symbols, and upon detection of a pilot data discontinuity, compensating for the discontinuity in the pilot data.

11. A channel estimator for estimating a channel impulse response of a sequence of Orthogonal Frequency Division Multiplexed (OFDM) symbols transmitted and received via a channel, each OFDM symbol comprising a plurality of data bearing sub-carriers on which data is transmitted and a plurality of pilot bearing sub-carriers on which pilot data is transmitted, the pilot sub-carriers being arranged within the OFDM symbols in accordance with a pilot sub-carrier pattern, the channel estimator comprising a pilot data extractor that extracts pilot data from the pilot sub-carriers of each OFDM symbol;

a pilot data extrapolator that generates extrapolated pilot data based on pilot data extracted from the pilot data sub-carriers; and a pilot data interpolator operable to process the pilot data by interpolating between the extrapolated pilot data in time and frequency to produce an estimate of the channel, wherein upon receipt of a control signal from a controller indicating a discontinuity in the pilot data contained within the received OFDM symbols has been detected, at least one of the a pilot data extractor, the pilot data extrapolator and the pilot data interpolator is arranged to compensate for the discontinuity in the pilot data.

12. A non-transitory computer-readable medium including a computer program providing computer executable instructions which when loaded onto a computer causes the computer to perform the method according to claim 10.

13. A channel estimator according to claim 11, wherein the sequence of OFDM symbols have been transmitted in accordance with a Digital Video Broadcasting (DVB) standard such as Digital Video Broadcasting-Cable 2 (DVB-C2).

14. A method of estimating a channel response as claimed in claim 10, wherein the sequence of OFDM symbols have been transmitted in accordance with a Digital Video Broadcasting (DVB) standard such as Digital Video Broadcasting-Cable 2 (DVB-C2).

\* \* \* \* \*